(12) United States Patent
Alegria

(10) Patent No.: US 9,975,632 B2
(45) Date of Patent: May 22, 2018

(54) AERIAL VEHICLE SYSTEM

(71) Applicant: Drona, LLC, Portland, OR (US)

(72) Inventor: Loren Alegria, Portland, OR (US)

(73) Assignee: Drona, LLC, Portland, OR (US)

(*) Notice: Subject to any disclaimer, the term of this patent is extended or adjusted under 35 U.S.C. 154(b) by 125 days.

(21) Appl. No.: 15/095,011

(22) Filed: Apr. 8, 2016

(65) Prior Publication Data

US 2017/0291704 A1    Oct. 12, 2017

(51) Int. Cl.
| | |
|---|---|
| *G05D 1/00* | (2006.01) |
| *B64C 39/02* | (2006.01) |
| *G01S 17/02* | (2006.01) |
| *G01S 13/02* | (2006.01) |
| *G01S 15/02* | (2006.01) |
| *G01S 19/13* | (2010.01) |
| *G01C 21/16* | (2006.01) |
| *B64D 47/08* | (2006.01) |

(52) U.S. Cl.
CPC .......... *B64C 39/022* (2013.01); *B64C 39/024* (2013.01); *B64D 47/08* (2013.01); *G01C 21/16* (2013.01); *G01S 13/02* (2013.01); *G01S 15/02* (2013.01); *G01S 17/02* (2013.01); *G01S 19/13* (2013.01); *G05D 1/0011* (2013.01); *B64C 2201/027* (2013.01); *B64C 2201/06* (2013.01); *B64C 2201/141* (2013.01)

(58) Field of Classification Search
CPC ..... B64C 39/022; B64C 39/024; B64D 35/06; B64D 47/08; G01C 21/16; G01S 15/02
USPC ........................ 701/2, 13, 14, 15, 36; 244/30
See application file for complete search history.

(56) References Cited

U.S. PATENT DOCUMENTS

| | | | | |
|---|---|---|---|---|
| 5,507,596 | A | * | 4/1996 | Bostelman ............... B63B 38/00 166/355 |
| 6,439,407 | B1 | * | 8/2002 | Jacoff ...................... B66C 13/06 212/272 |
| 7,510,142 | B2 | | 3/2009 | Johnson |
| 7,631,834 | B1 | | 12/2009 | Johnson et al. |
| 7,967,238 | B2 | | 6/2011 | Fuchs et al. |
| 8,109,711 | B2 | | 2/2012 | Blumer et al. |
| 8,157,205 | B2 | * | 4/2012 | McWhirk ................. B64B 1/02 212/274 |
| 8,590,829 | B2 | | 11/2013 | Keidar et al. |
| 8,602,349 | B2 | | 12/2013 | Petrov |
| 8,738,198 | B2 | | 5/2014 | Schempf |
| 8,777,157 | B2 | | 7/2014 | Barrett et al. |
| 8,872,818 | B2 | | 10/2014 | Freeman et al. |
| 8,876,571 | B2 | | 11/2014 | Trowbridge et al. |
| 8,909,389 | B2 | | 12/2014 | Meyer |

(Continued)

*Primary Examiner* — Gertrude Arthur Jeanglaude
(74) *Attorney, Agent, or Firm* — Kolisch Hartwell, P.C.

(57) ABSTRACT

A system is provided for maneuvering a payload in an air space constrained by one or more obstacles, and may include first and second aerial vehicles coupled by a tether to a ground station. Sensor systems and processors in the ground station and aerial vehicles may track obstacles and the tether's and the vehicles' positions and attitude to maneuver the payload and the tether to carry out a mission. The sensor system may include airborne cameras providing data for a scene reconstruction process and simultaneous mapping of obstacles and localization of aerial vehicles relative to the obstacles. The aerial vehicles may include a frame formed substantially of a composite material for preventing contact of the rotors with the tether segments.

74 Claims, 23 Drawing Sheets

(56) References Cited

U.S. PATENT DOCUMENTS

| | | |
|---|---|---|
| 8,931,727 B2 | 1/2015 | Engblom |
| 9,637,231 B2 * | 5/2017 | Chubb ................. B64C 39/022 |
| 2007/0200027 A1 | 8/2007 | Johnson |
| 2010/0013226 A1 | 1/2010 | Blumer et al. |
| 2011/0180667 A1 | 7/2011 | O'Brien et al. |
| 2011/0315810 A1 | 12/2011 | Petrov |
| 2012/0262708 A1 | 10/2012 | Connolly |
| 2012/0303179 A1 | 11/2012 | Schempf |
| 2013/0233964 A1 | 9/2013 | Woodworth et al. |
| 2013/0253733 A1 | 9/2013 | Lee et al. |
| 2014/0129059 A1 | 5/2014 | Scarlatti et al. |
| 2014/0131510 A1 | 5/2014 | Wang et al. |
| 2014/0231590 A1 | 8/2014 | Trowbridge et al. |
| 2014/0249693 A1 | 9/2014 | Stark et al. |
| 2014/0254896 A1 | 9/2014 | Zhou et al. |
| 2014/0263852 A1 | 9/2014 | Walker et al. |
| 2014/0267627 A1 | 9/2014 | Freeman et al. |
| 2014/0307525 A1 | 10/2014 | Postel et al. |
| 2014/0336928 A1 | 11/2014 | Scott |
| 2014/0353421 A1 | 12/2014 | Zhang et al. |
| 2015/0001339 A1 | 1/2015 | Gagne et al. |
| 2015/0021430 A1 | 1/2015 | Paduano et al. |
| 2015/0032295 A1 | 1/2015 | Stark et al. |
| 2015/0060606 A1 | 3/2015 | Wang et al. |
| 2015/0069174 A1 | 3/2015 | Wang et al. |
| 2015/0069968 A1 | 3/2015 | Pounds |
| 2015/0094883 A1 | 4/2015 | Peeters et al. |

\* cited by examiner

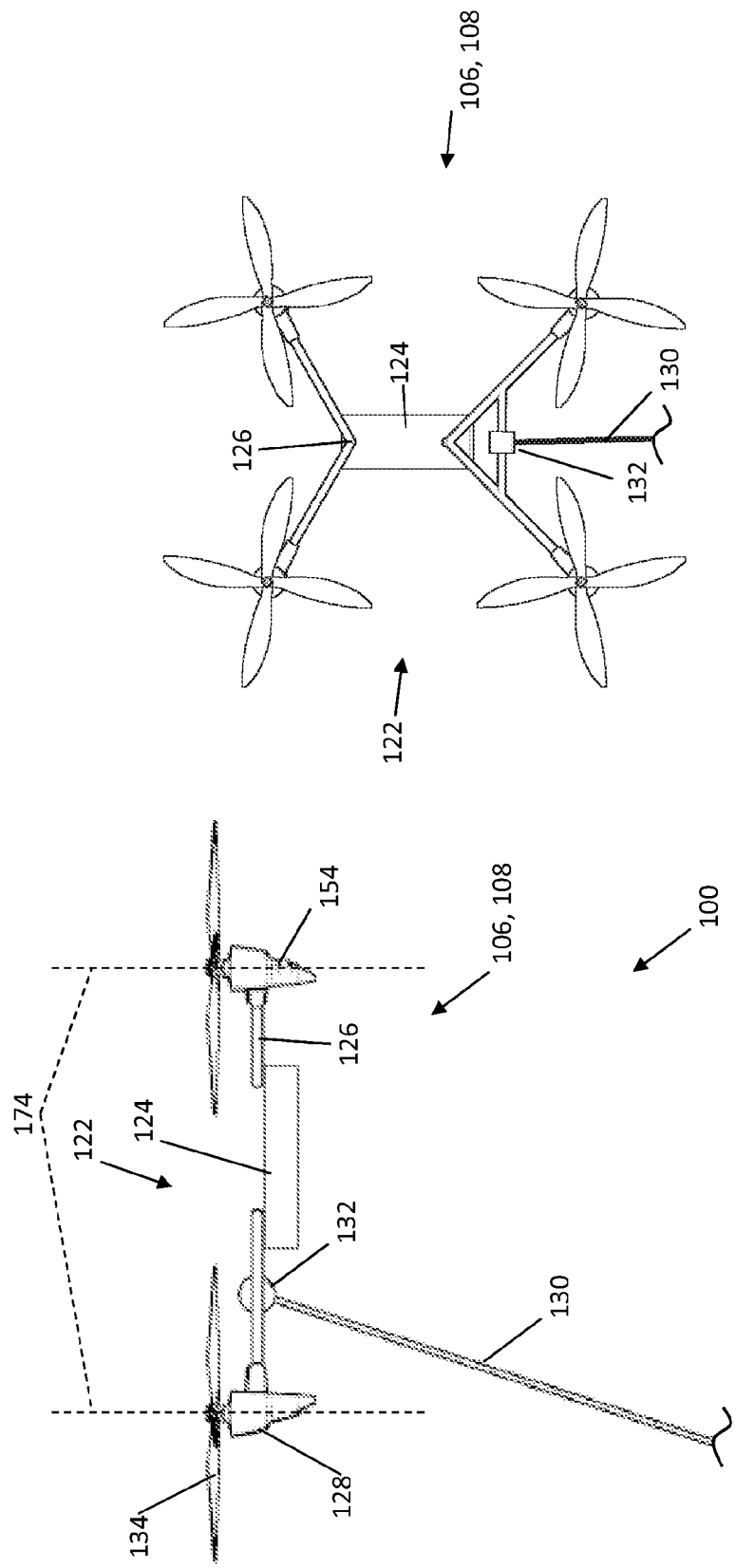

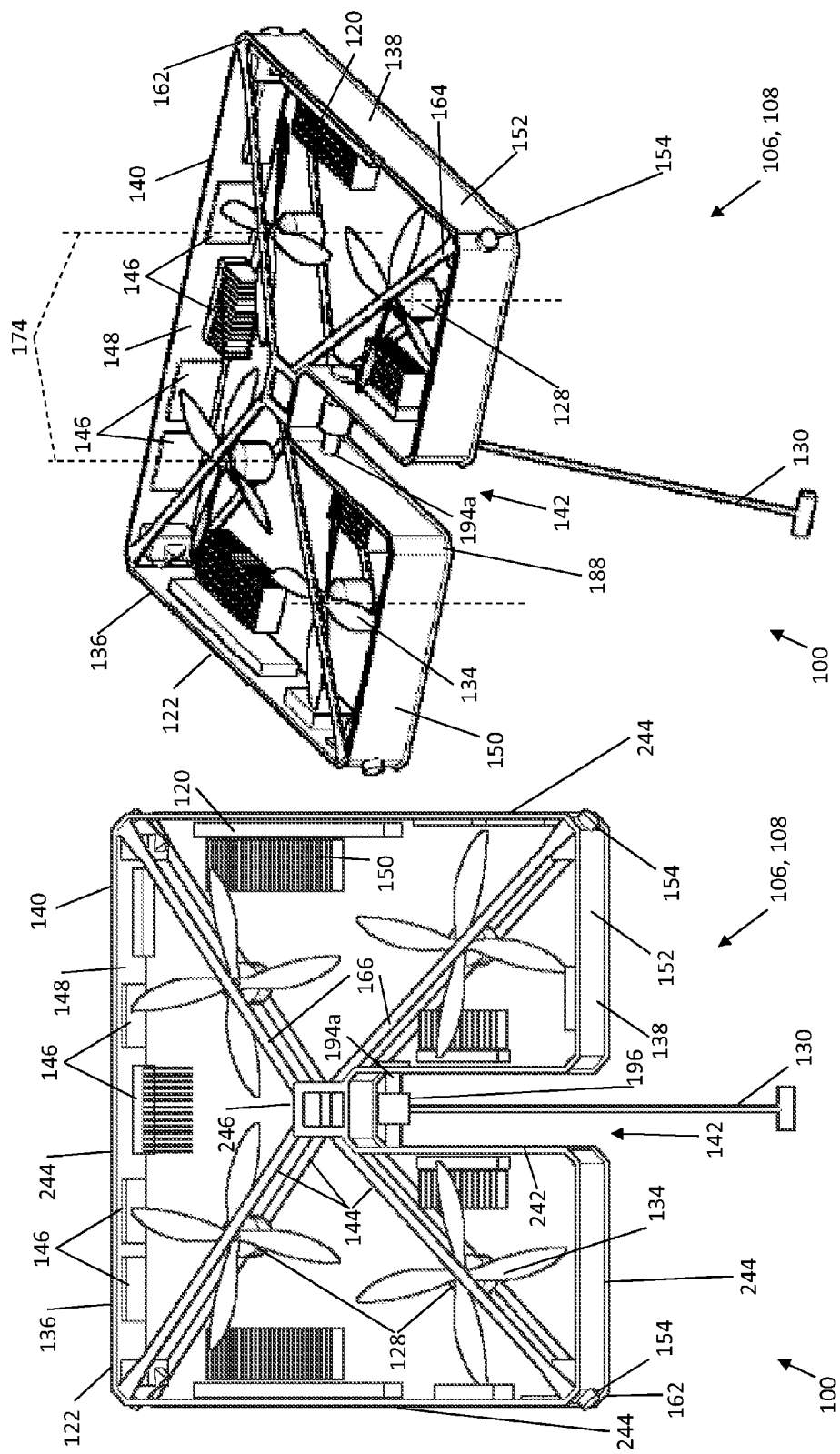

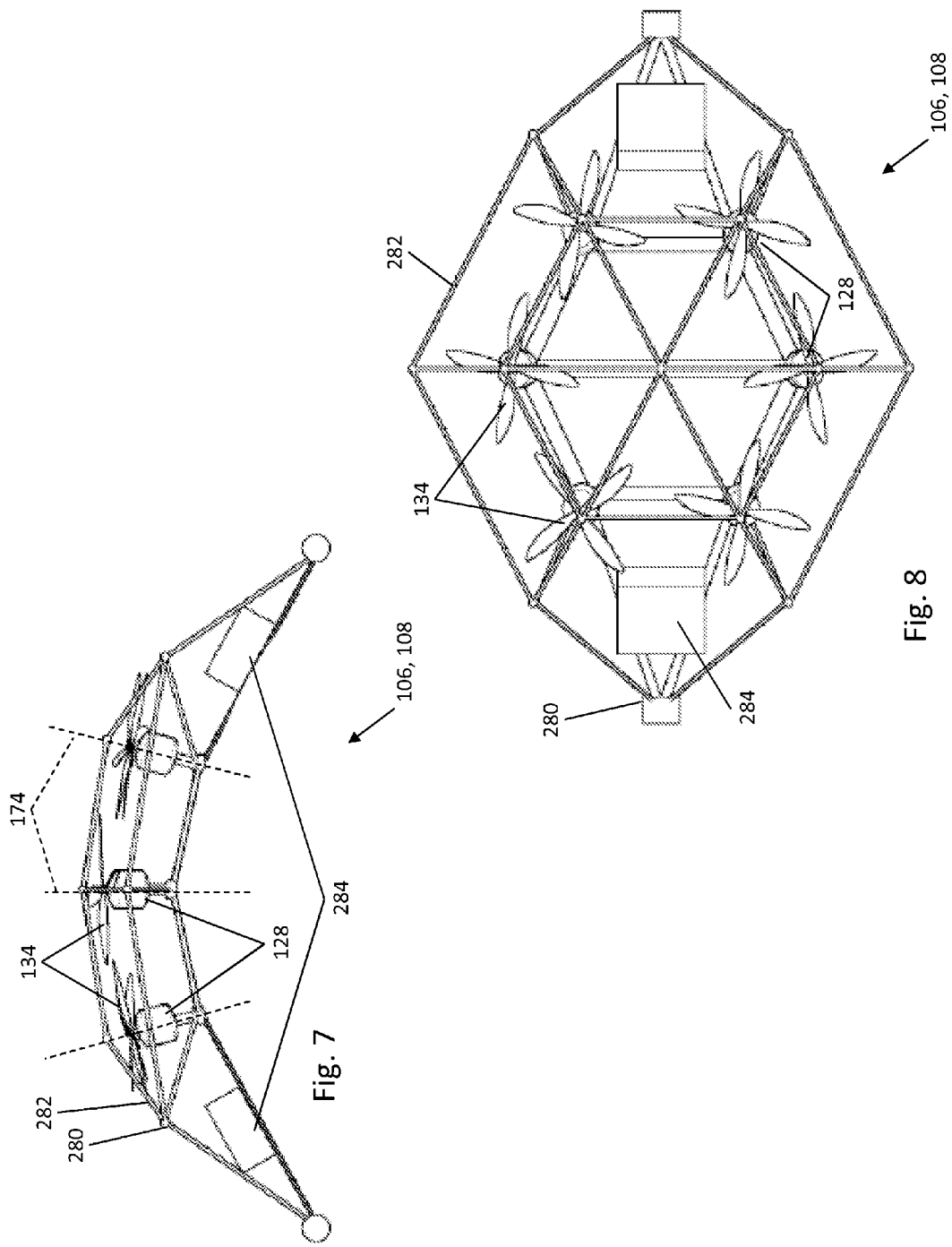

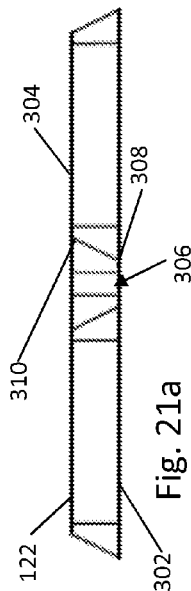
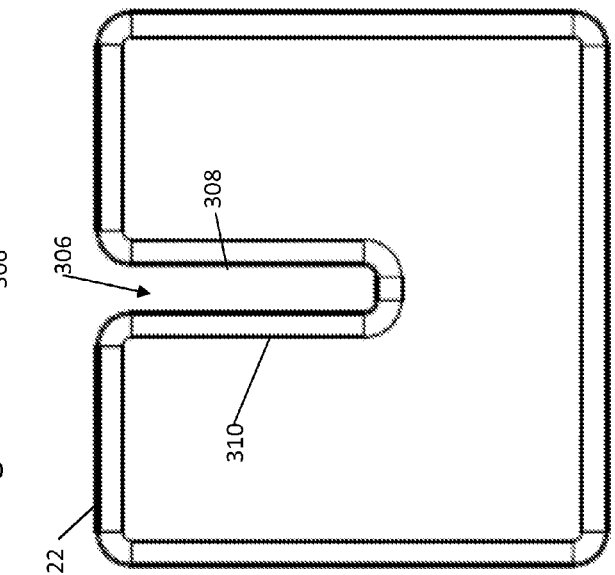
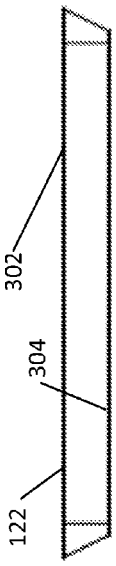
Fig. 21a    Fig. 21    Fig. 21c
Fig. 21b
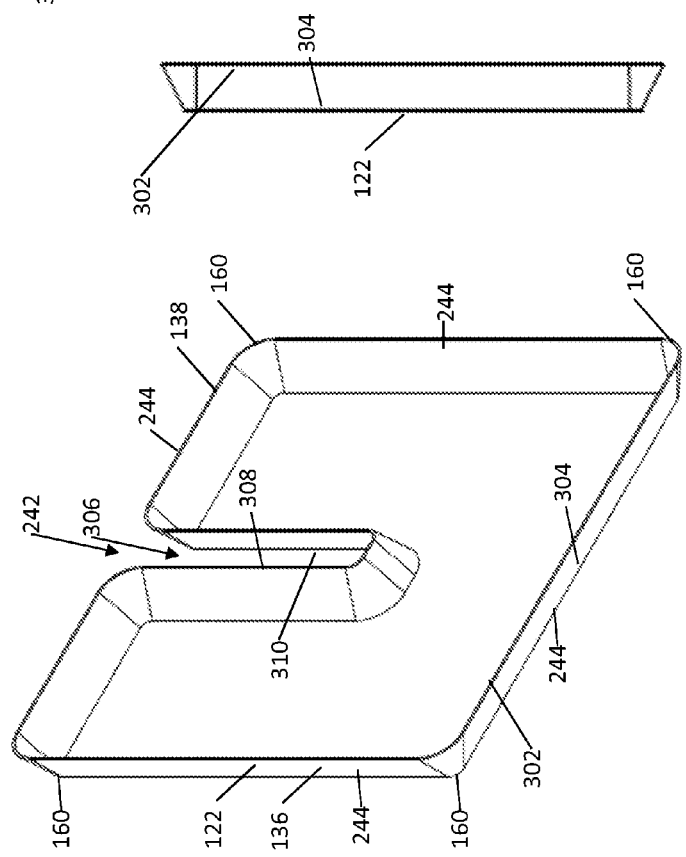
Fig. 20

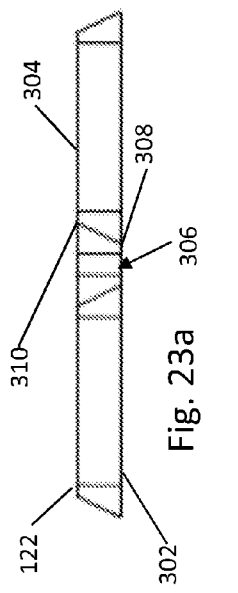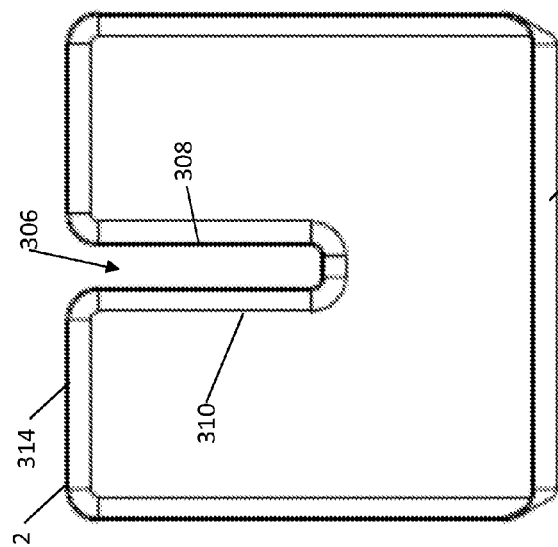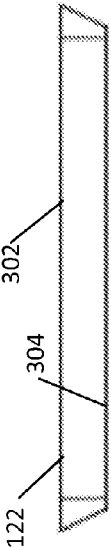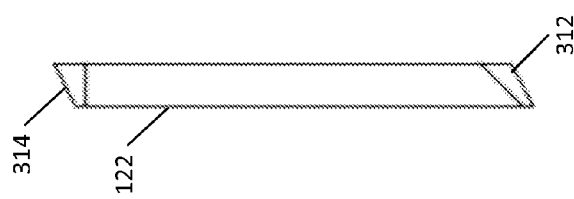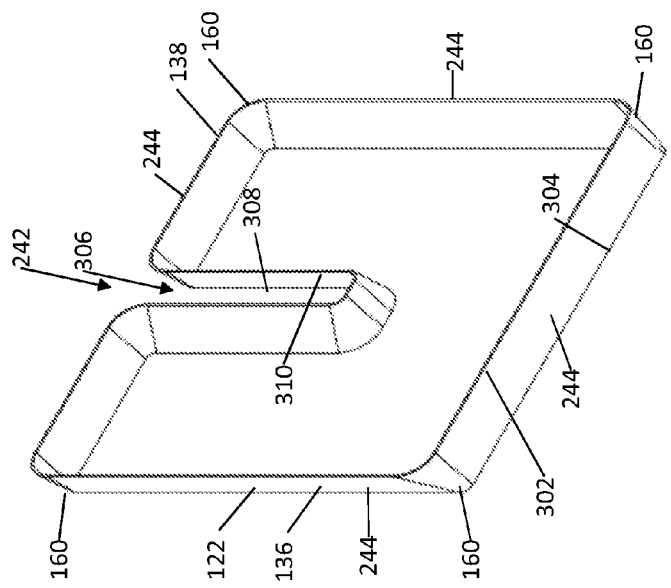

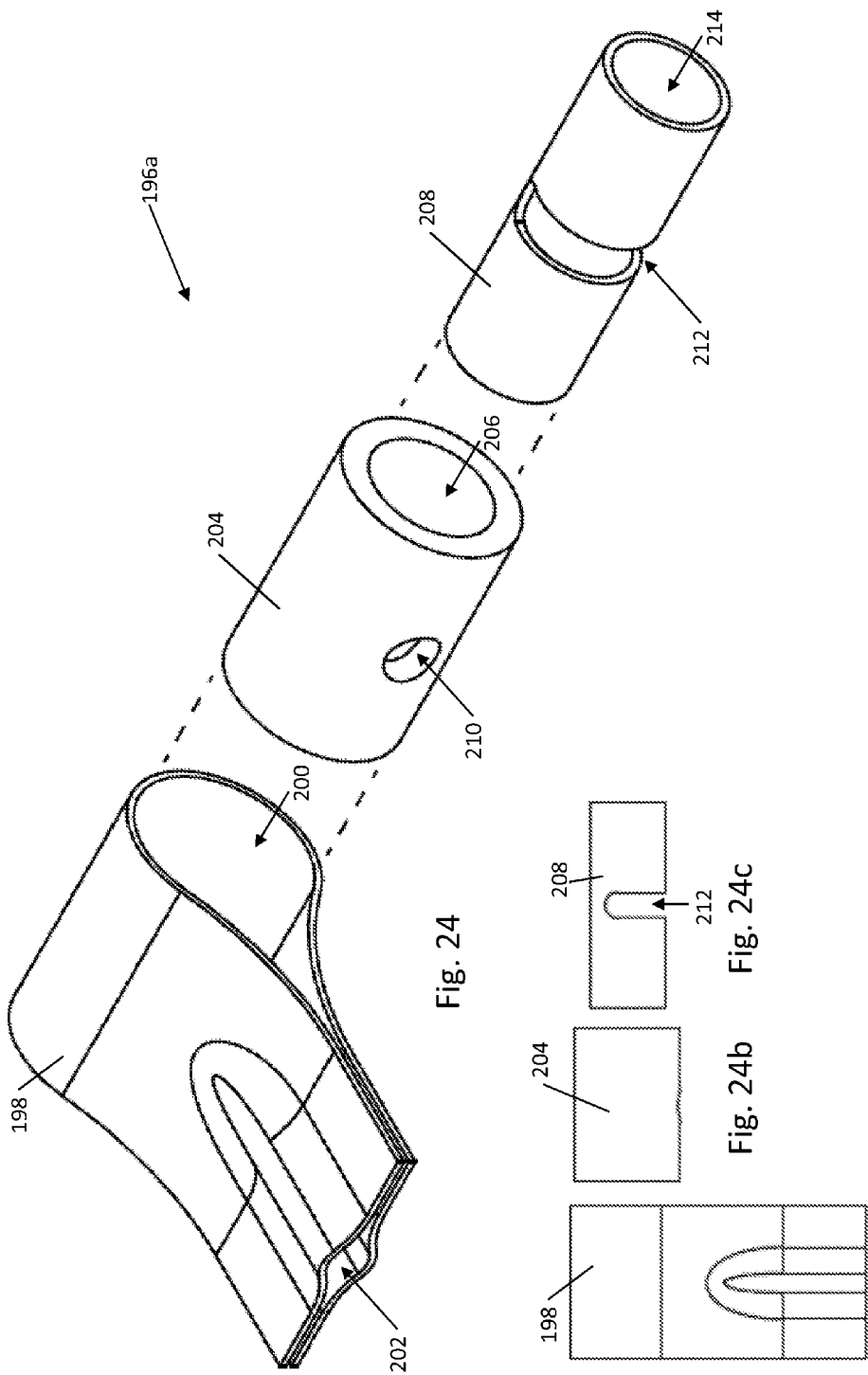

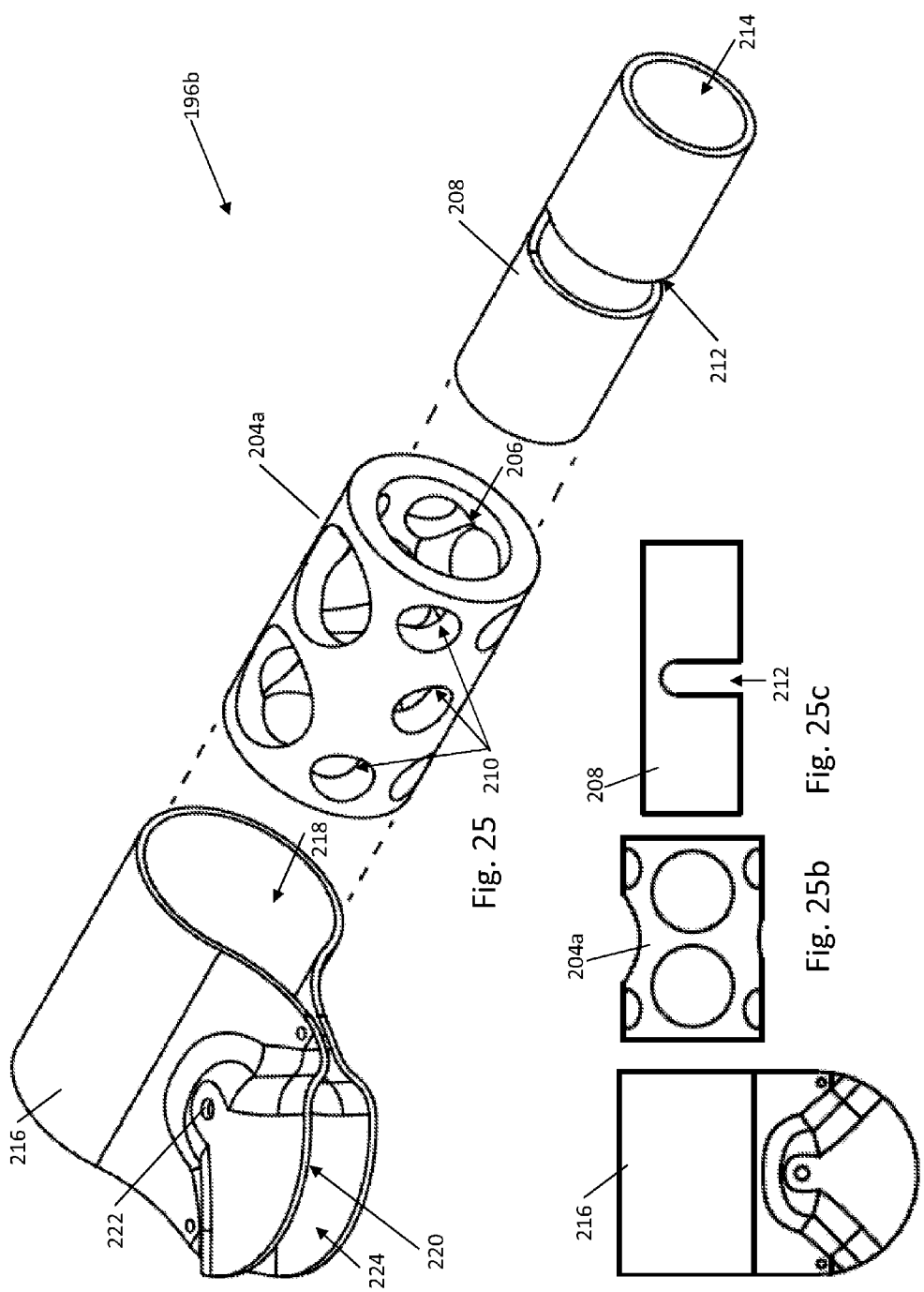

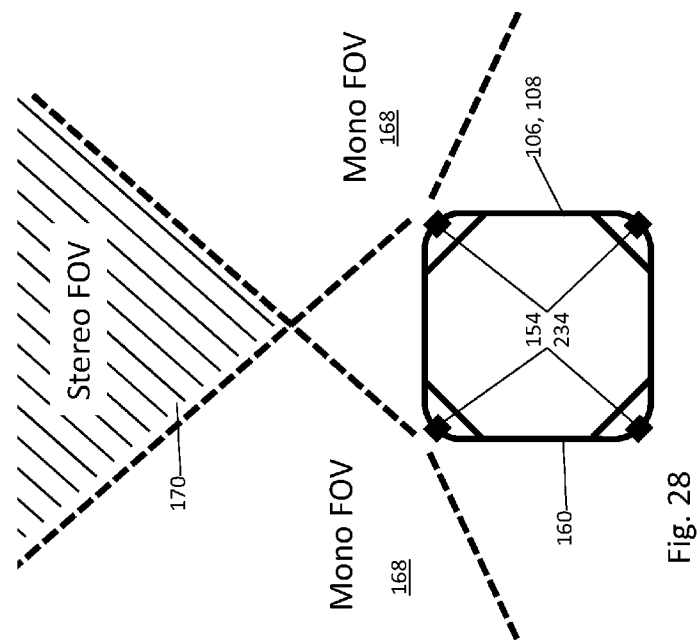
Fig. 28
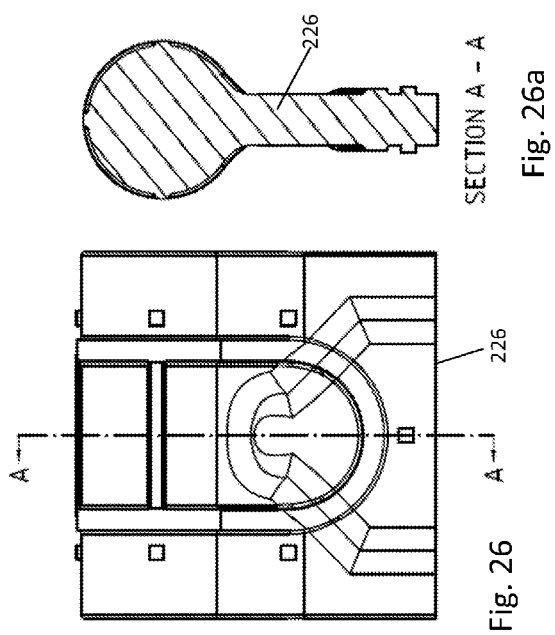
Fig. 26
Fig. 26a
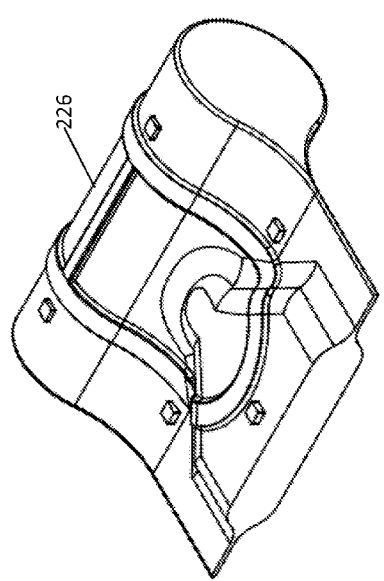
Fig. 26b

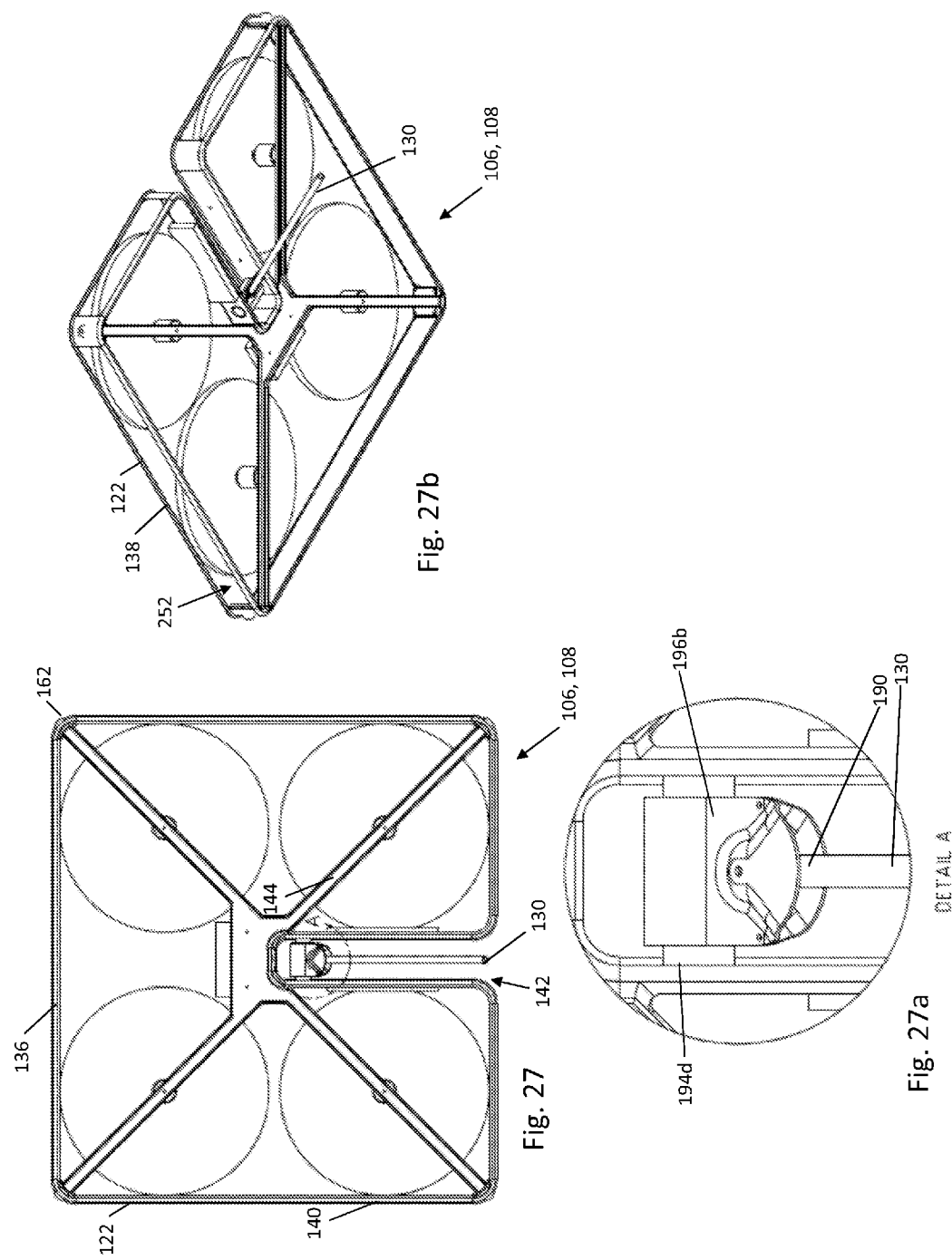

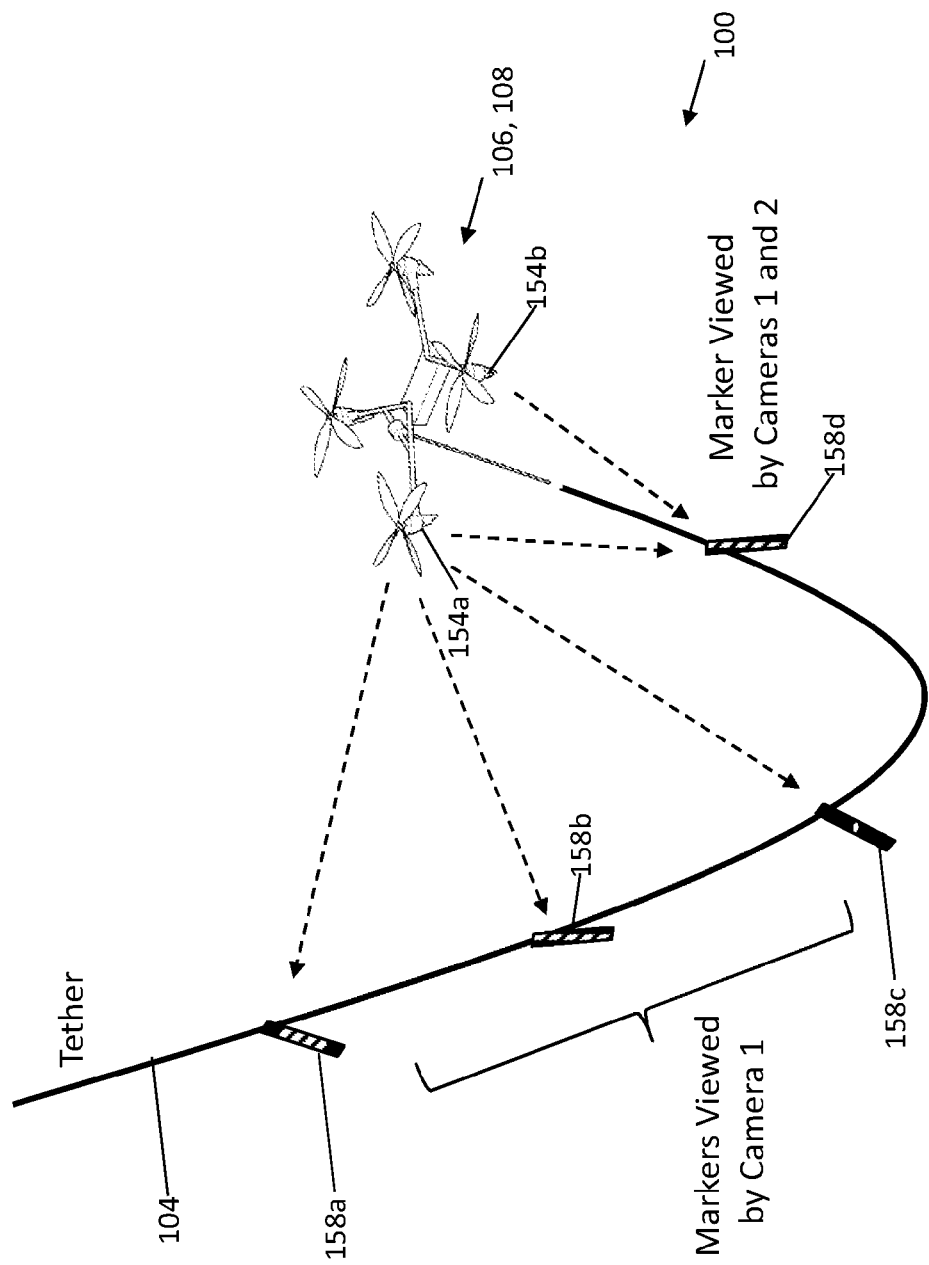

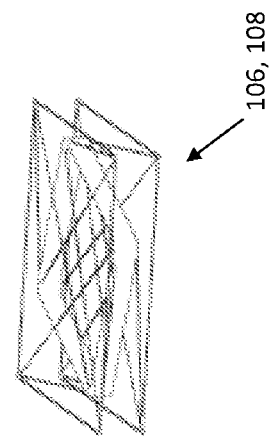
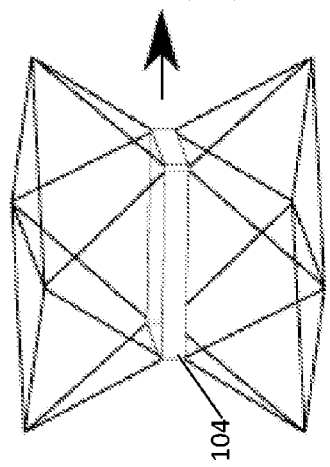
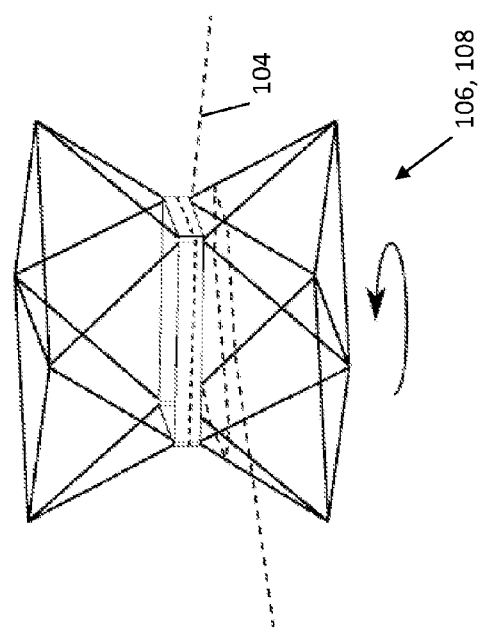
Fig. 33
Fig. 34
Fig. 35

AERIAL VEHICLE SYSTEM

BACKGROUND

In recent years, advances have enabled aerial vehicles, such as multi-rotor unmanned aerial systems (MUAS) to navigate complex spaces under an operator's control. But the maneuverability of MUAS comes at a great cost in power consumption. An unmanned aerial system (UAS), which may include multiple rotors, or other source of lift, are typically limited in operational endurance by on-board energy storage.

Numerous approaches to extending operational endurance focus on the energy storage, conversion, or power transmission. In embodiments of the present disclosure we describe a method of maneuvering a power and data line using an aerial vehicle system, which may include one or more accessory MUAS's. The method has advantages of economy, safety, and efficacy over previously described approaches. The power and data line may be provided by a tether and/or tether segments. The system may leverage a wide-bandwidth optical communication along the tether and/or tether segments to create a low-latency control system, which may be distributed between the ground and air units. The situations in which the system may be used include those requiring payloads with longer operational times, greater power consumption, and/or greater data production rates than current MUAS platforms.

The system permits the precise positioning of a detector and/or other tools within a large obstructed volume or air space. Embodiments where the system includes a plurality of unmanned aerial systems linked together along a tether may form a physical data network along with a power transmission line, terminated at a ground station at one end, and terminated at a primary data collection UAS at the other end. One or more intermediate UAS(s) may receive power and transmit and/or receive data and cooperate to avoid obstacles and accomplish a flight plan of the primary UAS. The present disclosure addresses multi-body aerial systems, their power systems, flight control architecture, and commercial applications.

BRIEF SUMMARY

According to one or more embodiments of the present disclosure, a system may include one or more aerial vehicles. The system may provide for maneuvering a payload in an air space constrained by one or more obstacles. A first aerial vehicle may include a processor for handling data about the flight characteristics of the first aerial vehicle. A second aerial vehicle may be configured to carry the payload. The second aerial vehicle may include a processor for handling data about the flight characteristics of the second aerial vehicle. Either aerial vehicle may carry a sensor system coupled to the processor in the aerial vehicle. The sensor may be configured to gather data about obstacles in the air space, to develop data about flight characteristics of at least one of the aerial vehicles, and to provide the data to the processor in the aerial vehicle. The system may further include a ground station having a flight control processor configured to maintain a first dataset about obstacles in the air space and a second dataset about flight characteristics of the one or more aerial vehicles. A first tether segment may couple the ground station to the first aerial vehicle and a second tether segment may couple the second aerial vehicle to the first aerial vehicle. The tether segments may provide a path for power from the ground station to the aerial vehicles and/or a path for data transmission between the ground station and the aerial vehicles and/or a wireless link to the ground station may provide data transmission between the ground station and the aerial vehicles. One or more of the aerial vehicles may include a plurality of spaced-apart rotors configured to spin about a substantially vertical axis during flight of the aerial vehicle and a frame with a structure for preventing contact of the rotors with the tether segments.

The sensor system may include an obstacle sensor and/or a position sensor and/or an attitude sensor. An obstacle sensor may be a camera-based sensor, a laser-based sensor, a radar-based sensor, a LIDAR-based sensor, an acoustic-based sensor, or any sensor suitable for the particular obstacles to be sensed. Examples of suitable position sensors include a GPS unit, an inertial navigation unit, an inertial measurement unit, a barometer, or any sensor suitable for developing information about aerial vehicle position for a particular application. Examples of suitable attitude sensors include a magnetometer, an accelerometer, a sun sensor, or any attitude sensor suitable for a particular type of vehicle and use.

An array of four cameras may be carried by the aerial vehicle, which cameras may be located at four maximally separated positions on the aerial vehicle. The processor in the aerial vehicle may process the data using a scene reconstruction process. The processors in the aerial vehicles and the ground station may provide simultaneous mapping of obstacles and localization of aerial vehicles relative to the obstacles, and this may be applied to fixed obstacles and/or moving obstacles, which may include data about the other aerial vehicle.

In one or more embodiments of the present disclosure, a tethered aerial vehicle system may include a ground station, an aerial vehicle, and a tether segment coupling the ground station to the aerial vehicle. The aerial vehicle may include a plurality of spaced-apart rotors configured to spin about a substantially vertical axis during flight of the aerial vehicle. The substantially vertical axes may be spaced apart from one another. The aerial vehicle may include a frame defining a plurality of corners and a plurality of substantially straight arms interconnecting the corners, and wherein each rotor is located adjacent a corner. The frame may include a structure for preventing contact of the rotors with the tether segment. The structure for preventing contact of the rotors with the tether segment may include a stand-off joint coupled between the tether segment and the aerial vehicle. The frame may define a planform that is substantially quadrilateral and surrounds the rotors to prevent contact of the rotors with the tether segment. The planform may include a slot that allows the aerial vehicle to fly level with or below the tether segment. The stand-off joint may be pivotally coupled to the aerial vehicle for movement through the slot. The frame may include a band, which may be formed substantially of a composite material such as an aramid-epoxy composite, defining an outline of the planform with a substantially quadrilateral shape.

In one or more embodiments of the present disclosure a system for maneuvering a payload in an air space constrained by one or more obstacles may include a first aerial vehicle having a processor for handling data about the flight characteristics of the first aerial vehicle and a second aerial vehicle configured to carry the payload. The second aerial vehicle may include a processor for handling data about the flight characteristics of the second aerial vehicle. A first sensor system may be carried by one of the first and second aerial vehicles. The sensor system is typically coupled to the processor in the aerial vehicle in which it is carried. The sensor may be configured to gather data about obstacles in the air space and to develop data about flight characteristics of at least one of the first and second aerial vehicles. The sensor system may be configured to provide the data to the processor to which the sensor system is coupled. A second sensor system may be carried by the other one of the first and second aerial vehicles to provide data about flight characteristics of the aerial vehicle by which it is carried to the processor in the aerial vehicle. The system may include a ground station having a flight control processor configured to maintain a first dataset about obstacles in the air space and a second dataset about flight characteristics of the first and second aerial vehicles. A first tether segment may couple the ground station to the first aerial vehicle. A second tether segment may couple the second aerial vehicle to the first aerial vehicle. Typically, at least one of the aerial vehicles includes a plurality of spaced-apart rotors and the rotors are configured to spin about a substantially vertical axis during flight of the aerial vehicle. One or more of the aerial vehicles may include a frame with a structure for preventing contact of the rotors with the tether segments, which may include a stand-off joint coupled between the tether segment and the aerial vehicle. The tether segments may provide a path for power from the ground station to the aerial vehicles and/or a path for data transmission between the ground station and the aerial vehicles and/or a wireless link to the ground station may provide data transmission between the ground station and the aerial vehicles. The processors in the aerial vehicles and the ground station may provide simultaneous mapping of obstacles and localization of aerial vehicles relative to the obstacles.

According to one or more embodiments of the present disclosure, a system for maneuvering a payload in an air space constrained by one or more obstacles may include an aerial vehicle defining an airframe and configured to carry the payload. The aerial vehicle may include a processor for handling data about the flight characteristics of the aerial vehicle. A sensor system may be carried by the aerial vehicle and be coupled to the processor in the aerial vehicle. The sensor system may include a plurality of cameras pointing outward from the airframe configured to gather data about obstacles in the air space and to provide the data to the processor. Typically, each camera pointing outward from the airframe of the aerial vehicle defines a field of view, and the fields of view of at least two cameras are overlapping. The plurality of cameras may include two, three, or four cameras pointing outward from the airframe of the vehicle, or any number of cameras suitable to a particular application. For example, with an airframe defining a planform that is substantially quadrilateral with four corners, each one of four cameras may be located adjacent one corner of the planform.

The processor may receive the data from the cameras and process the data using a scene reconstruction process. The scene reconstruction process may include one or both of a stereophotogrammetry process and an optical flow process. The processor may use a key frame bundle adjustment in calculating at least one vector to at least one obstacle and/or a trajectory of the aerial vehicle. The system may include a ground station and a tether coupling the ground station to the aerial vehicle, and the tether may provide a path for power from the ground station to the aerial vehicles and/or a path for data transmission between the ground station and the aerial vehicles and/or a wireless link to the ground station may provide data transmission between the ground station and the aerial vehicles. The system may include a second aerial vehicle, and first and second tether segments coupling the ground station and the aerial vehicles. The sensor system may include a position sensor such as a GPS unit, an inertial navigation unit, an inertial measurement unit, and/or a barometer. The sensor system may include an attitude sensor such as a magnetometer, an accelerometer, and/or a sun sensor. Either or both of the position sensor and the attitude sensor may provide data to the processor, which may use an extended Kalman filter to integrate data from the position and/or attitude sensors with data from the cameras. The processor in the aerial vehicle provides simultaneous mapping of obstacles and localization of the aerial vehicle relative to the obstacles.

According to one or more embodiments of the present disclosure, the processor in an aerial vehicle may include more than one processing units, e.g., a camera processing unit for processing data from each camera and a processing unit for integrating data from the camera processing units to calculate a navigation solution of the aerial vehicle. A camera processing unit may include at least one graphical processing unit.

According to one or more embodiments of the present disclosure, a tethered aerial vehicle system may include a ground station, an aerial vehicle including a frame and a plurality of spaced-apart rotors configured to spin about a substantially vertical axis during flight of the aerial vehicle, a stand-off joint coupled to the frame of the aerial vehicle, and a tether segment coupled between the ground station and the stand-off joint. The frame may define a planform that is substantially quadrilateral and surrounds the rotors to prevent contact of the rotors with the tether segment. The planform may include a slot and the stand-off joint may be pivotally movable through the slot. The stand-off joint may provide a substantially rigid or semi-rigid interconnect between the frame of the aerial vehicle and the tether segment. The stand-off joint may be coupled to the frame of the aerial vehicle by a universal joint, e.g., one formed by a pair of pivot joints with axes that are substantially orthogonal. Alternatively, the universal joint may be formed by a pair of eyebolts. The universal joint may include a tube formed of a composite material and a bushing mounted for rotational motion around the tube.

According to one or more embodiments of the present disclosure, a system for maneuvering in an air space may include an aerial vehicle including a frame and a plurality of spaced-apart rotors configured to spin about a substantially vertical axis during flight of the aerial vehicle, and a stand-off joint coupled at one end to the frame of the aerial vehicle and coupled at the other end to a payload, e.g., a camera. The system may include a tether segment and a ground station, with the tether segment coupled between the ground station and the stand-off joint.

According to one or more embodiments of the present disclosure, a system for maneuvering a payload in an air space constrained by one or more obstacles may include an aerial vehicle defining an airframe and configured to carry the payload. The aerial vehicle may include a processor for handling data about the flight characteristics of the aerial vehicle. A sensor system may be carried by the aerial vehicle and be coupled to the processor in the aerial vehicle. The sensor system may be configured to gather data about obstacles in the air space and to provide the data to the processor in the aerial vehicle. The processor in the aerial vehicle may calculate a cost function based on the flight characteristics of the aerial vehicle and the obstacles in the air space. The system may include a ground station having a flight control processor and a tether coupling the ground station to the aerial vehicle. The aerial vehicle may communicate with the ground station with the processor in the aerial vehicle providing the cost function to the flight control processor in the ground station. The flight control processor may be configured to optimize the cost function for control of the aerial vehicle.

According to one or more embodiments of the present disclosure, a system for maneuvering a payload in an air space constrained by one or more obstacles may include a first aerial vehicle having a processor for handling data about the flight characteristics of the first aerial vehicle and a second aerial vehicle configured to carry the payload and having a processor for handling data about the flight characteristics of the second aerial vehicle. The system may include a ground station having a flight control processor configured to maintain a first dataset about obstacles in the air space and a second dataset about flight characteristics of the first and second aerial vehicles. A first tether segment may couple the ground station to the first aerial vehicle and a second tether segment may couple the second aerial vehicle to the first aerial vehicle. A first sensor system may be carried by one of the first and second aerial vehicles and coupled to the processor in that aerial vehicle. The sensor may be configured to gather data about obstacles in the air space and to develop data about flight characteristics of at least one of the first and second aerial vehicles. The sensor system may be configured to provide the data to the processor to which the sensor system is coupled to calculate a cost function based on the flight characteristics of the aerial vehicle and the obstacles in the air space. The aerial vehicle processor may provide the cost function to the flight control processor in the ground station. The flight control processor may be configured to optimize the cost function for control of at least one of the aerial vehicles.

BRIEF DESCRIPTION OF THE SEVERAL VIEWS OF THE DRAWINGS

FIG. 1 is a side view of an aerial vehicle according to an embodiment of the present disclosure showing an airframe carrying a plurality of rotors horizontally separated from one another and configured to spin about substantially vertical axes, and showing a tether segment or stand-off joint coupled to the airframe.

FIG. 2 is an overhead view of the aerial vehicle of FIG. 1, showing four rotors horizontally separated from one another and the tether segment or stand-off joint coupled to the airframe.

FIG. 5 is an overhead view of the aerial vehicle of FIG. 4, showing four rotors horizontally separated from one another and the tether segment or stand-off joint coupled to the airframe.

FIG. 6 is an isometric view of the aerial vehicle of FIGS. 4 and 5.

FIG. 7 is a side view of an aerial vehicle according to an embodiment of the present disclosure showing an airframe carrying a plurality of rotors horizontally separated from one another and configured to spin about substantially vertical axes, and showing the airframe having structure to prevent contact with the rotors.

FIG. 8 is an overhead view of the aerial vehicle of FIG. 7, showing six rotors horizontally separated from one another.

FIG. 20 is an isometric view of an airframe for an aerial vehicle with sloped side surfaces and a top periphery defining a larger planform than a lower periphery, and with a slot in the airframe where the slot is narrower at the upper edge than at the lower edge.

FIGS. 21-21c are an overhead view, a front elevation view (inverted), a side elevation view, and a rear elevation view of the airframe of FIG. 20.

FIG. 22 is an isometric view of an airframe for an aerial vehicle with sloped side surfaces similar to FIG. 20-21c, but with oppositely sloped front and rear edges.

FIGS. 23-23c are an overhead view, a front elevation view (inverted), a side elevation view, and a rear elevation view of the airframe of FIG. 22.

FIG. 24 is an exploded view of the components of a structure for a single-axis pivoting stand-off joint using a composite material for connecting a stand-off to an aerial vehicle airframe.

FIGS. 24a-c are overhead views of each of the three components of the structure for the pivoting joint of FIG. 23.

FIG. 25 is an exploded view of the components of a structure for a dual-axis pivoting stand-off joint using a composite material for connecting a stand-off to an aerial vehicle airframe, with a lightweight bushing.

FIGS. 25a-c are overhead views of the three components of the structure for the pivoting joint of FIG. 25.

FIGS. 26-26b are an overhead view, cross-sectional view, and isometric view of a mold for the dual-axis pivot joint structure of FIG. 25.

FIGS. 27-27b are an overhead view, a detail view, and an isometric view of an aerial vehicle, similar to that of FIGS. 4-6, including the dual-axis standoff joint of FIG. 25 and having openings along the sides of the airframe.

FIG. 28 is an overhead view of an aerial vehicle with four-cornered planform with cameras mounted adjacent each corner and showing the overlap of the fields of view of two of the cameras.

FIG. 29 is a perspective view of a tethered aerial vehicle in flight showing camera angles to a set of optical markers on the tether.

FIG. 33 is an airframe for an aerial vehicle, showing a mechanical structure that deploys and serves as a spool during landing operations by the entire aerial vehicle spinning around its axis in order to spool in the tether.

FIG. 34 is an airframe as in FIG. 33 in a deployed configuration, where several of the airframe's members contain threads or elastic elements which can be pulled by a single actuator to deploy the frame.

FIG. 35 is the airframe as in FIGS. 33 and 34 showing a collapsed configuration.

DETAILED DESCRIPTION

Figure 4:
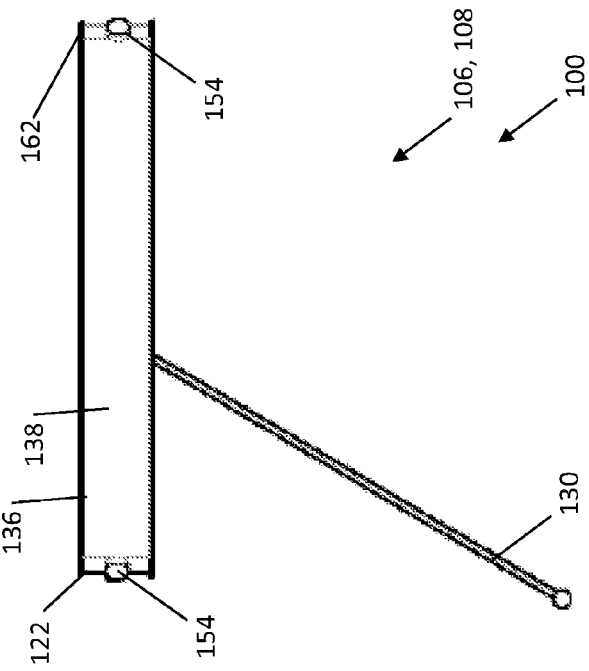
FIG. 4 is a side view of an aerial vehicle according to an embodiment of the present disclosure showing an airframe carrying a plurality of rotors horizontally separated from one another and configured to spin about substantially vertical axes, and showing a tether segment or stand-off joint coupled to the frame, and showing the airframe having structure to prevent contact with the rotors.
Figure 3:
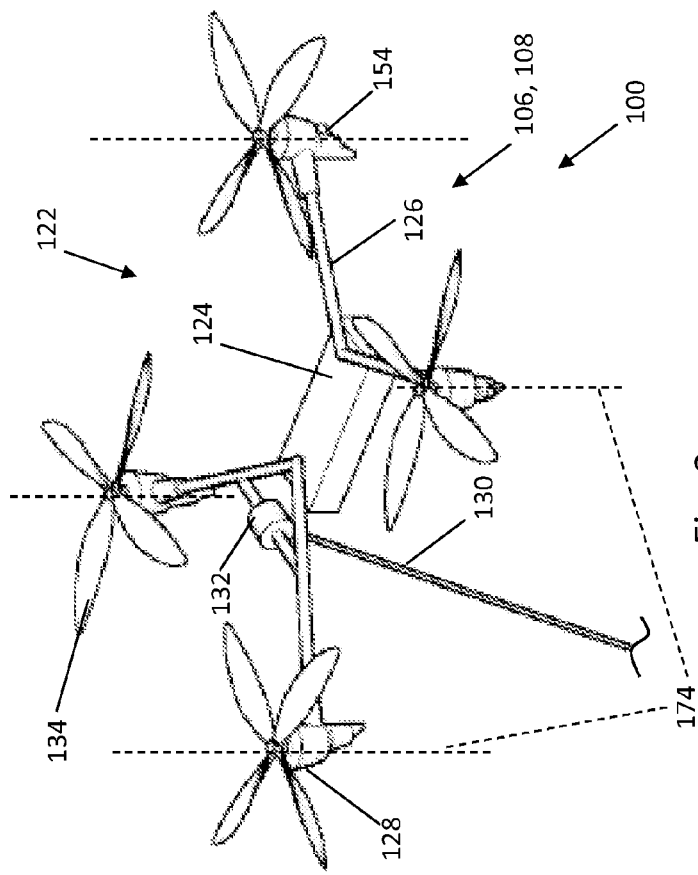
FIG. 3 is an isometric view of the aerial vehicle of FIGS. 1 and 2.

A system according to the present disclosure may include one or more aerial vehicles and may be tethered to a ground station or untethered. For example, the system may make use of one or more aerial vehicles, such as small, low-cost, electronically powered UAS units with onboard computational resources depicted in FIGS. 1-12. A system 100 may include a ground station 102, such as a base station, which may include a computer, a transmitter, and a power supply. Ground station 102 may remain at a fixed location during flight operations and typically is sized and configured to be transported to a location adjacent the flight operation. System 100 may include a tether 104 coupled to ground station 102 leading to one or more tether-carrying UAS(s) 106 and then to a primary UAS 108 with a data acquisition payload 110. Tether 104 may include a power line 112 (FIGS. 13 and 14) that may be maintained at a safe DC voltage and converted into a useful power source for the UAS by a DC-DC converter, such as a compact DC-DC converter.

The system may be provided with a power source at the ground station, which power is reduced and regulated at each UAS. In addition, each UAS may be provided with a small battery for intermittent loads and emergency operations. Embodiments for a power system are described below.

Ground control station 102 typically includes a flight control system, such as flight control processor 114 (FIGS. 9-11), a power transformer, one or more data transceivers 116, a landing system, such as a spool 118, and one or more sensors such as a GPS antenna for real-time-kinematic GPS and a camera for tether position measurement.

Typically, primary UAS 108 carries a primary data collection module 110, while the auxiliary UAS's carry only electronics necessary for flight control, so primary UAS 108 may be provided with a power supply 120 (e.g., FIG. 5) that is larger in comparison to those in the auxiliary UAS's in order to power this module. Primary data collection module 110 may be suspended beneath primary UAS 108 or mounted in any manner suitable to the particular application of the system. In a multi-vehicle system, typically each auxiliary UAS is coupled to two tether segments, one extending toward the ground station and one extending to the next UAS in the chain and the primary UAS is positioned at the distal end of the UAS chain with a single tether connection linking it back to the chain.

The system may incorporate data from multiple sensors for both the data acquisition mission and for flight control. Typically, the primary payload executes the primary data collection mission. The data collection module may write to the primary UAS computer which may send the data to the base station wirelessly or by a linear fiber optic network, which may run along the tether segments and encompass all the UAS units. At the base station the primary data and flight control data may be stored and the flight control data may be processed and translated into flight commands for sending to the UAS units on the network.

Flight control sensors in each UAS may include GPS units, magnetometers, accelerometers, barometers, sun sensors, tether orientation transducers, and optical cameras. In one or more embodiments, cameras may be located at four maximally separated positions on each UAS unit, facing outward to provide a large field of view and parallax effects which may be significant in various applications of such a system. In embodiments with such a camera system, an algorithm may be employed to generate position and environmental information based on the camera system.

In one or more embodiments for an airframe 122 (depicted in FIGS. 1-3), the electronics may be located in an enclosure 124 near the center of a structural frame 126 that may suspend four motors 128 and a tether standoff 130 that may extend from a pivot 132 on frame 126. Each motor 128 typically supports and drives a rotor 134 configured to provide aerodynamic lift to the airframe.

In one or more embodiments for airframe 122 (depicted in FIGS. 4-6, 12, and 27) a rigid frame 136 may surround rotors 134. Frame 136 may include a band 138 wrapped around a rectangular perimeter 140 with a slot 142 through which tether standoff 130 is able to rotate. A set of structural members 144 may span this rectangle, supporting motors 128 and rotors 134. Frame 136 may be formed of a composite material, e.g., an aramid-epoxy composite, or any material suitable to a particular application of the system. One or more electronic assemblies 146 for power supplies, sensors, detectors, and flight control (e.g. power supply 120) may be mounted to frame 136, e.g., on a flat, internal surface 148 of band 138. Such configuration may allow motors 128 and rotors 134 to provide a dual function of propulsion and forced-air cooling, which may be particularly advantageous for power-intensive components and their heat management structures, such as fins 150 of power supply 120.

Rectangular perimeter 140 of frame 136 defines an exterior, such as a flat, exterior surface 152 of band 138. The exterior of frame 136 may be employed as a spool for tether 104 when landed. See also FIGS. 33-34.

A system using one or more UAS's in accordance with one or more embodiments of the present disclosure may be fully manually operable, and may include human controls for each UAS unit. Alternatively or in combination, the auxiliary and/or primary UAS's may be automatically positioned to prevent collisions of the UAS's with tether 104 and/or other UAS's and obstacles in the air space. Typically, system 100 maintains a level of pose awareness and cooperative behavior between the UAS's.

Figure 12:
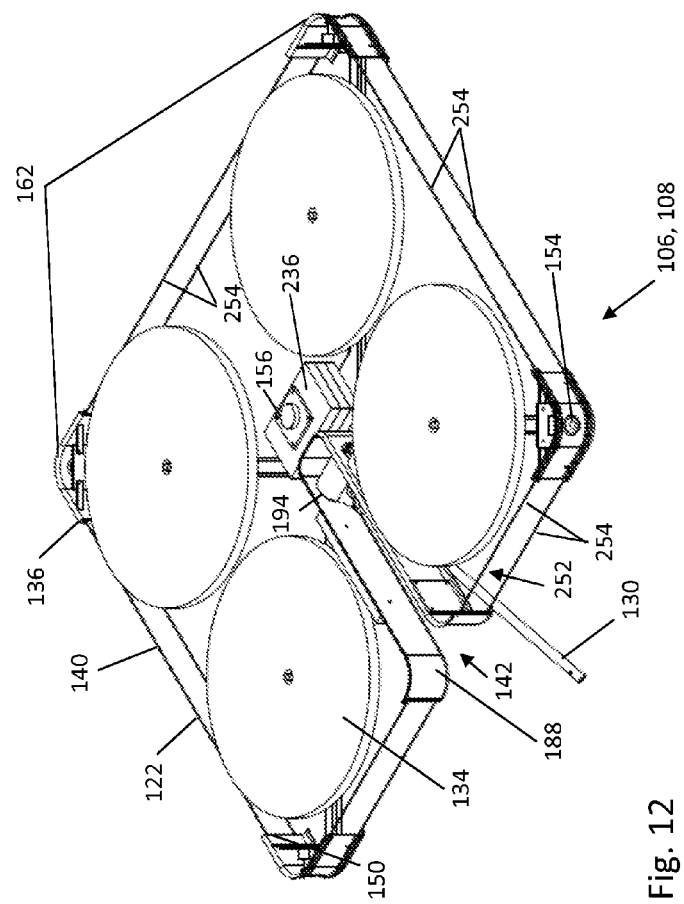
FIG. 12 is an isometric view of an aerial vehicle similar to that of FIGS. 4 and 5 and showing additional sensors/detectors/controls.

For any configuration involving more than one UAS and/or a tether, and for any scenario in which a working air space AS is obstructed and the system is flying under automatic control, the system may include sensing capabilities for object avoidance. Such sensing capabilities may include one or more cameras, e.g., wide angle cameras 154 and/or a sun sensor 156 (FIG. 12). As may be seen in FIG. 12, electronics and other equipment may be mounted to airframe 122, such as a flight controller (central brick), the sun detector (disk on top of that brick), and a GPS unit (square towards the end of the standoff slot), and cameras/vision modules at corners of the frame. Camera(s) 154 may provide a data stream for 3D reconstruction photogrammetry based on computer vision libraries.

Camera(s) 154 with or without such photogrammetry may permit tracking of tether position and orientation by optical marker flags 158 (FIG. 29) along tether 104. Other means may be used to facilitate tether tracking, such as sensing at the point of connection to the UAS the position of the stand-off joint of the tether segment. As one option, the point of connection may include a detector for measuring the angle between tether standoff 130 and airframe 122. Sun sensor 156 may provide a channel of high-confidence orientation when illuminated. Additionally or alternatively, the sensors may include GPS, accelerometer, magnetometer, and a primary data acquisition payload.

Sensing cameras 154 may provide for a multiview optical system as may be seen in FIGS. 1-6 and 28-29. Such optical system may be provided on any configuration of a UAS. As an example as shown in FIG. 28, an aerial vehicle 106 or 108 may define a four-cornered planform 160 with cameras 154 mounted adjacent each corner 162, e.g., adjacent an end 164 of arms 166 (FIGS. 5-6) supporting the rotors. Typically cameras 154 face outward. FIG. 28 shows a field of view (FOV) for each camera 154, which is typically a mono FOV 168. Between two adjacent cameras 154 the mono FOV's 168 may overlap, forming a stereo FOV 170. Typically a four-camera system will form four such stereo FOV's 170.

As shown in FIG. 29, a set of optical markers may be positioned on tether 104 and their position sensed by the optical system on a tethered aerial vehicle in flight. Angles 168 from cameras 154 to markers 158 on tether 104 illustrate the mono and stereo FOV's. In FIG. 29, optical markers 158*a-d* are in the mono FOV of camera 154*a*, and optical marker 158*d* is in the mono FOV of camera 154*b*. Thus, marker 158*d* is within the stereo FOV 170*a* formed between the mono FOV's of cameras 154*a* and 154*b*.

Optical markers 158 may be brightly colored (e.g., orange) ribbon or webbing at intervals on tether 104 and different markers may be distinguished from one another based on a unique marking of each marker, e.g., a barcode at the end of the ribbon. Alternatively, or in combination, one or more LED(s), which may emit light at a specified frequencies may be used as marker(s). LED(s) may provide more accuracy and reliability for identification and additionally may require additional wiring and/or other structure to be added to the tether construction. Alternatively to, or in combination with the UAS-based camera system, one or more camera(s) may be provided on the ground, e.g., at ground station 102 to identify and locate the markers. Basing such camera(s) on the ground would typically allow for heavier, higher resolution cameras than the airborne camera(s).

The optical system using multiple cameras 154 typically includes a camera array, such as the four-cornered arrangement described above, and attendant software and hardware. Cameras 154 may include wide angle lenses, e.g., sapphire lenses, allowing each camera a field of view which is approximately 180 degrees in width. Other lenses and angles may be selected as suitable for a particular application of the system.

The array of four cameras at each of four corners of airframe 122 is an example of locating sensors at maximally separated positions on the aerial vehicle. Processor(s) in ground station 102 and/or UAS 106*a* and/or 108 may process data from the cameras using a scene reconstruction process, including a stereophotogrammetry process and/or an optical flow process. This may include the range imaging technique known as "structure from motion." The processors in the aerial vehicles and the ground station may provide simultaneous mapping of obstacles and localization of aerial vehicles relative to the obstacles. Such mapping may be applied to fixed obstacles (e.g., tree TR in FIG. 11) and/or moving obstacles, such as another aerial vehicle (e.g., other UAS's in FIGS. 9-11).

As noted above, camera(s) 154 may provide a data stream for 3D reconstruction photogrammetry based on computer vision libraries. The storage and processing of the computer vision libraries and the 3D reconstruction photogrammetry may make use of computational resources in both the ground station and the aerial vehicles and may distribute the storage and processing among the various platforms. For example, a computer with larger storage capacity and higher processing power may be used for reference to existing GIS data, and to perform regressions and/or other machine learning routines on parts of the vision-navigation model. Other processing requiring more resources included the optimizing of big-picture questions such as determining which color and/or feature types are best to navigate by; determining the distance at which features provide the most navigational utility; determining the existence of small mobile features;

determining whether an object is likely to be a solid, liquid, gas, tree-like, grassy, brush, or other structure.

Processing for these big-picture determinations may require computational resources that are more readily available in a ground-based configuration. So, in one or more embodiments, the UAS's may transmit substantially all of their video to the ground station for processing there because this may require a powerful machine, which may use standard algorithms. On the other hand, low power vision processing chips, such as the Myriad 2 vision processor made by Movidius, may provide sufficient, airborne, on-board processing performance to allow for the individual aerial vehicles to be independently capable of precise navigation.

One or more optical video feed(s) from cameras 154 may be integrated through processing in one or more algorithms to calculate a position of the aerial vehicle and to construct a model of one or both of a static and a dynamic environment of the aerial system within the air space. Such algorithm(s) may utilize two methods in parallel to perform these functions: optical flow scene reconstruction, which produces 3D color point cloud data from image time-series, and stereophotogrammetry, which produces 3D color point cloud data from overlapping regions of static images. An extended Kalman filter may be used to process successive point clouds into data describing the position and orientation of each aerial vehicle as it moves over time. Such algorithm(s) may identify optically recognizable 3D points in the environment, and of these certain individual features may be used for navigation and/or collected as data. Such algorithm(s) may assess a score for such points and individual features of reliability and usefulness over time. If a particular feature scores highly in one method (either stereophotogrammetry or optical flow scene reconstruction), then computational priority may be given to that method for that feature and/or related features.

High quality features with stable positions over time may be recorded and incorporated into a map of the static 3D environment in the air space. Such operation is typically independent of airspace to the extent that features (distinctive 'points' in the field of view) will be detected, compared between views and reconstructed into a 3D space. The selection of features may be fine-tuned in a given airspace, and the interpretation of those features may be fine-tuned, (e.g. in some airspaces encountering smoke or cloud is probable, in some it is improbable and rounded grey bodies are interpreted as solids).

High quality features that do not have stable positions but have physically realistic trajectories may be incorporated into a history of the dynamic environment in the air space. Once established, the static and dynamic environments are further processed to establish obstacles in the environment.

The data from the airborne sensors may be transmitted by fiber optic cable to the base station computer where it may be stored and integrated for real time flight planning and control. For some applications, the advantages of having a tether, such as reliable, wide bandwidth communications and ample stable power, may justify the added complexity of the tether-handling system.

Figure 9:
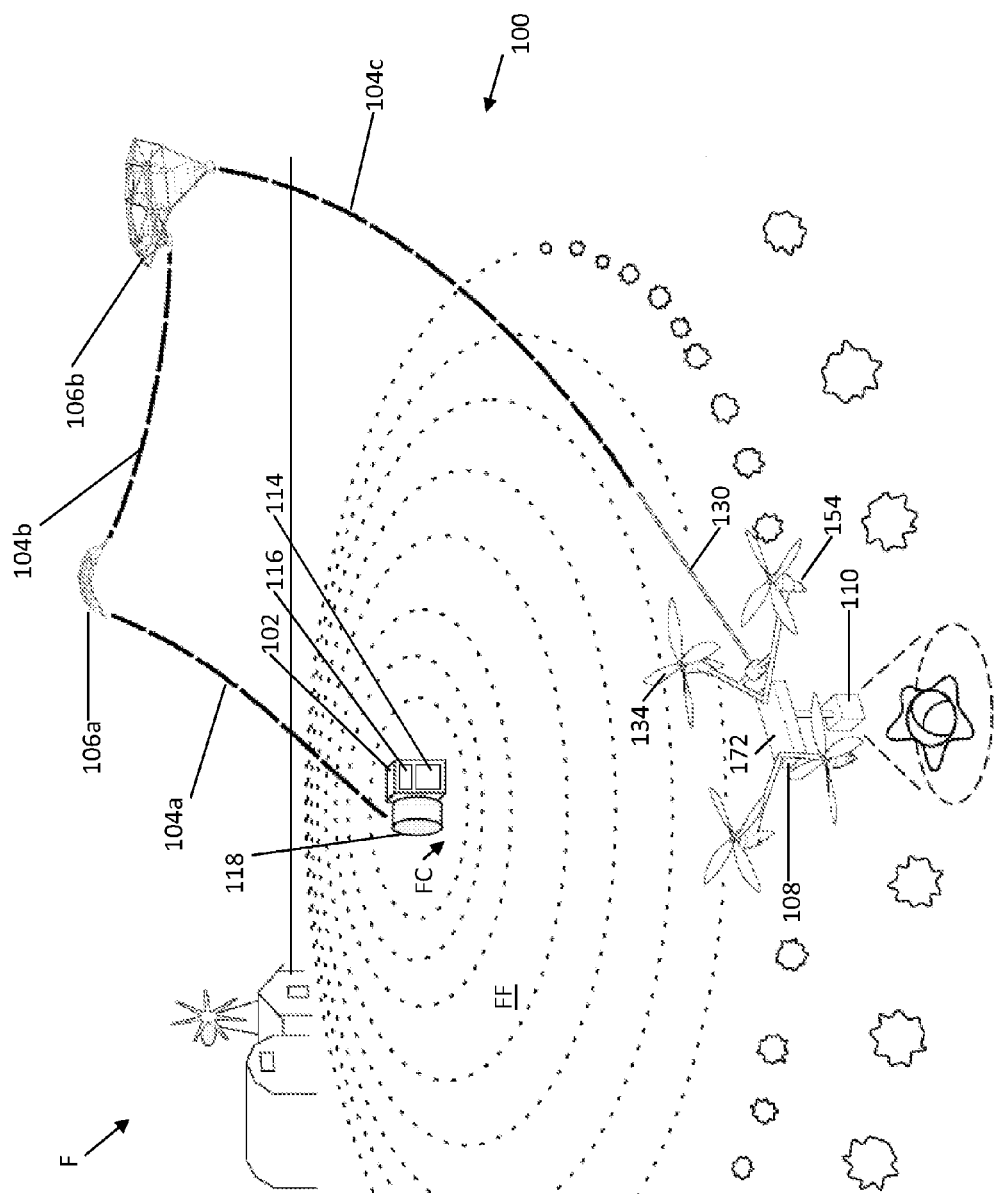
FIG. 9 is a perspective view of an aerial system using aerial vehicles as in FIGS. 1-3 and 7-8 in a use case in agriculture, showing agricultural data gathering within a center-pivot-irrigated farm.
Figure 10:
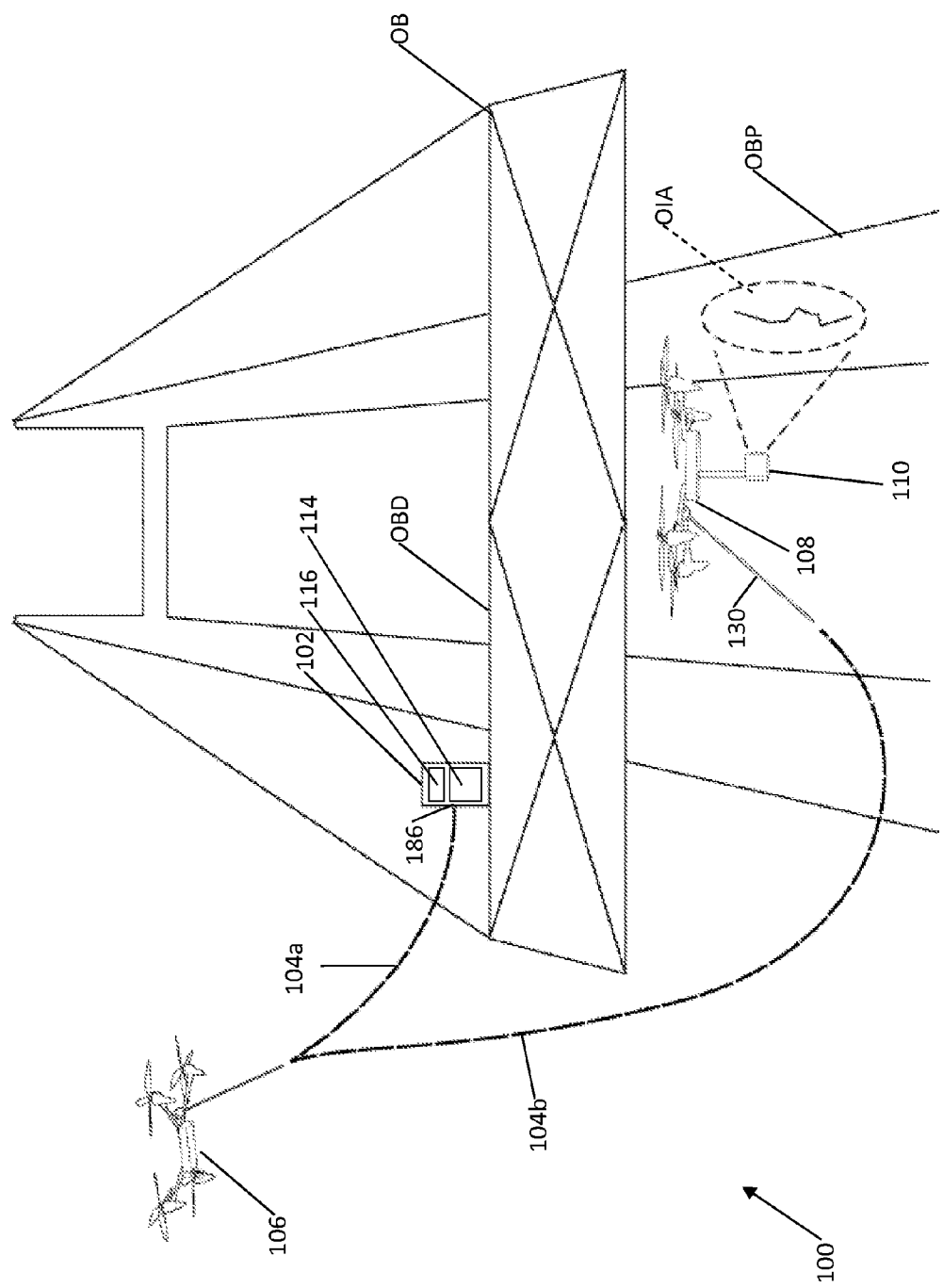
FIG. 10 is a perspective view of an aerial system with a ground station coupled by tether segments to two aerial vehicles, each with a stand-off joint coupled to a tether segment and showing a use case of an inspection of a bridge, shown in partial cross-section, including inspection of bridge structural elements using optical imaging or other payloads such as an impact-echo module.
Figure 11:
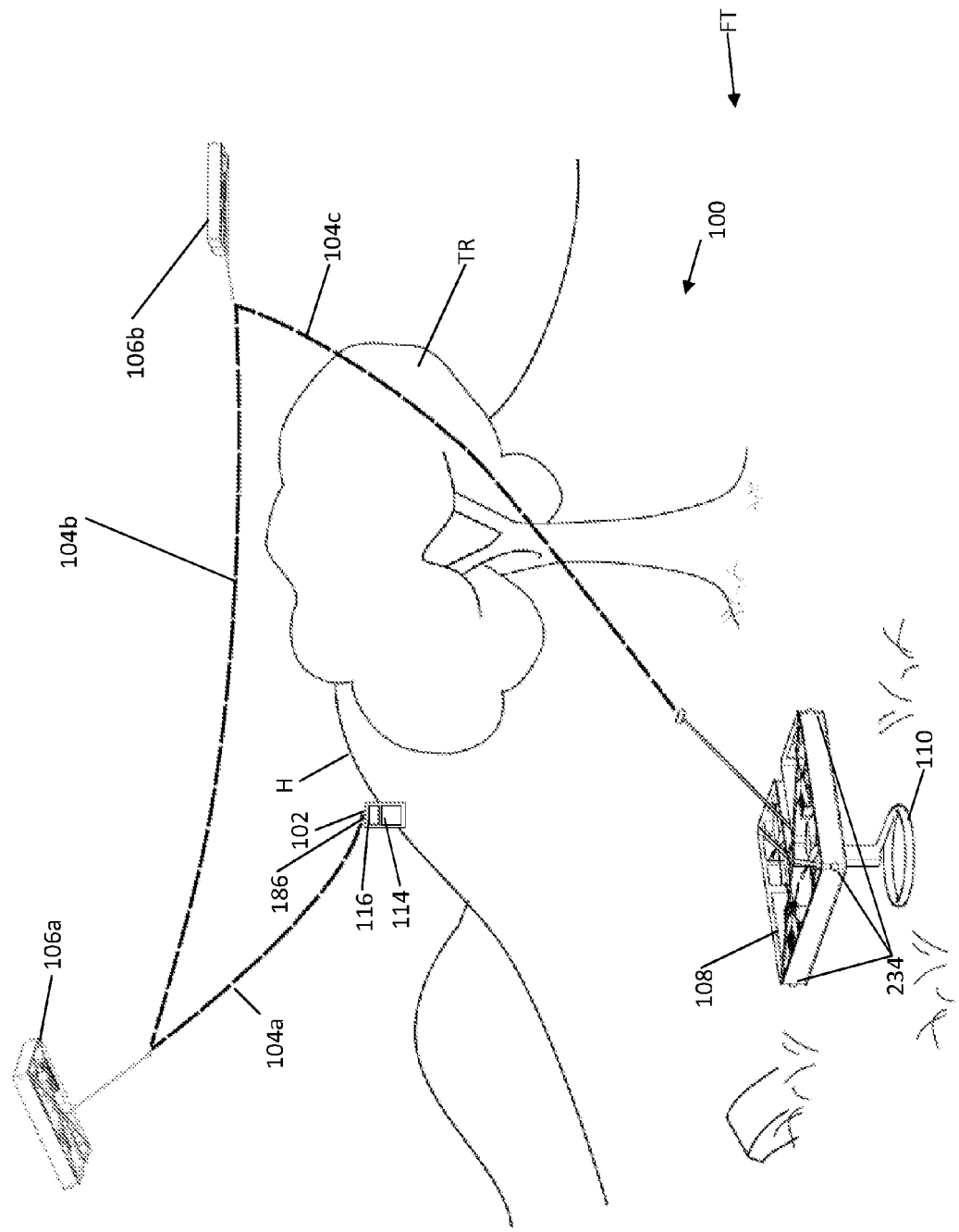
FIG. 11 is a perspective view of an aerial system with a ground station coupled by tether segments to three aerial vehicles, each with a stand-off joint coupled to a tether segment and showing a use case in a hazardous materials search operation, such as mine-sweeping, in an obstructed environment including a tree, over which the aerial vehicles have maneuvered the tether segments.

As may be seen in FIGS. 9-11, system 100 may provide for maneuvering a payload 110 in an air space constrained by one or more obstacles. A first aerial vehicle, such as UAS 106, may include a processor 172 (FIGS. 5-6) for handling data about the flight characteristics of the first aerial vehicle. A second aerial vehicle, such as UAS 108, may be configured to carry payload 110. Second aerial vehicle 108 may include a processor 172 for handling data about the flight characteristics of the second aerial vehicle. Either aerial vehicle may carry a sensor system, such as corner-mounted array of four cameras 154, coupled to processor 172 in the aerial vehicle. The sensor may be configured to gather data about obstacles in the air space, to develop data about flight characteristics of at least one of the aerial vehicles, and to provide the data to the processor 172 in the aerial vehicle.

System 100 may further include ground station 102 that includes flight control processor 114 configured to maintain a first dataset about obstacles in the air space and a second dataset about flight characteristics of the one or more aerial vehicles. Data about obstacles in the air space typically includes an absolute position in the air space and/or position relative to an aerial vehicle, as well as size and velocity of the obstacles. Data about the flight characteristics of the aerial vehicles typically includes positions, attitudes, and velocities of the aerial vehicles, in absolute terms for the air space and/or relative to one another. First tether segment 104a may couple the ground station to first aerial vehicle 106 and second tether segment 104b may couple second aerial vehicle 108 to first aerial vehicle 106. Tether segments 104a, 104b may provide a path for power from ground station 102 to the aerial vehicles and/or a path for data transmission between ground station 102 and the aerial vehicles. Alternatively, a wireless link to ground station 102 may provide data transmission between ground station 102 and the aerial vehicles. Aerial vehicles 106, 108 may include rotors, such as the four horizontally spaced-apart rotors 134 of FIGS. 1-6 or the six horizontally spaced-apart rotors 134 of FIGS. 7-8, configured to spin about a substantially vertical axis 174 during flight of the aerial vehicle. Frame 136 may provide a structure for preventing contact of the rotors with the tether segments, as shown in FIGS. 4-8.

Generally, airframes in different configurations, such as four rotors versus six rotors or the substantially flat profile of FIGS. 4-6 versus the substantially curved profile of FIGS. 7-8 may be used interchangeably as an intermediate UAS or a primary UAS. FIG. 9 depicts system 100 with a combination of different airframes for carrying out an application of the system.

The application in FIG. 9 is a use case in agricultural data gathering within a center-pivot-irrigated farm F. Ground station 102 has been transported to, and is positioned at a center FC of a field FF. A first tether segment 104a couples ground station 102 to a first intermediate UAS 106a. A second tether segment 104b couples first intermediate UAS 106a to a second intermediate UAS 106b. A third tether segment 104c couples second intermediate UAS 106b to primary UAS 108 through standoff 130. Primary UAS 108 may carry data acquisition payload 110 for inspection and gathering of data on crops and other aspects of field FF. Payload 110 may be any type of sensor, such as a camera, suitable to the particular application.

Different types of sensors may be mounted, alternatively or in combination, on the primary UAS 108 as is desired for a particular operation, and may be changed and reconfigured in between operations. System 100 may be used in agriculture for a wide array of data-gathering, such as mapping of water levels, and/or nutrient and growth distribution mapping. Use of interchangeable payloads allows use of system 100 by farms and ranches to form maps of crop and pasture health, water levels, soil nutrient levels.

As shown in FIG. 10 a system 100 according to one or more embodiments of the present disclosure may be used to inspect a bridge OB. System 100 in the example shown in FIG. 10 includes ground station 102 positioned on a deck OBD of bridge OB, and two airborne aerial vehicles 106, 108. Ground station 102 is coupled by tether 104 to the aerial vehicles, specifically by a first tether segment 104a from ground station 102 to intermediate UAS 106 and by a second tether segment 104b from intermediate UAS 106 to primary UAS 108. Each of the aerial vehicles are preferably coupled to the tether segments at stand-off joints 130. System 100 may carry out an inspection of bridge structural elements, such as a bridge pier OBP, using a data acquisition payload such as an optical imager or other payload(s) such as an impact-echo module. Intermediate UAS is depicted flying above and to the outside of bridge deck OBD to hold tether 104 clear of the upper and side surfaces of bridge deck OBD, allowing primary UAS to maneuver the data acquisition payload to an inspection area OIA of bridge pier OBP below bridge deck OBD. Primary UAS 106 may provide inspection data back to ground station 102 during the inspection and one or both of UAS 106 and 108 may receive power from ground station 102. Receiving power from ground station 102 may allow longer flight times and heavier payloads as compared to a drone carrying its own power. Additionally, providing power to airborne sensors from the ground station via the tether may allow use of sensors requiring high power consumption that would be unfeasible to provide via drone-carried power.

System 100 may be used in inspection of building and other infrastructure. System 100 may allow the user to conduct structural inspections at lower cost, with lower risk, and with a greater degree of automation than current methods. As one example, the system could be used in many cases where a costly man-lift is currently used to hoist inspectors, or where a platform is suspended and lowered, to perform visual inspections. Such automatically acquired inspection data may have greater consistency and completeness than conventional inspection data, allowing for software-based comparison of data collected at regular inspection cycles. As a result, defects could be identified automatically. For example, an automatic data collection plan could be used to acquire images of the entire surface of a steel or concrete bridge. These images could be automatically processed to detect rust or cracks.

FIG. 11 depicts system 100 carrying out a use case of mine sweeping in an obstructed environment. Here, ground station 102 is located on a hill H adjacent a field FT with a tree TR. A first tether segment 104a couples ground station 102 to a first intermediate UAS 106a. A second tether segment 104b couples first intermediate UAS 106a to a second intermediate UAS 106b. A third tether segment 104c couples second intermediate UAS 106b to primary UAS 108 through standoff 130. In this case, primary UAS 108 may carry a detector with electromagnetic, acoustic, ultrasonic, or any suitable means for detection of objects below ground.

The minesweeping operation depicted in FIG. 11 requires no contact with the ground in field FT. FIG. 11 depicts a simplified version of the obstacles that may be encountered and avoided in operation of system 100 and more than two intermediate UAS's may be used in airspaces obstructed in a more complicated manner. Similarly, more than one primary UAS 108 may be used as suited to a particular application. First intermediate UAS 106a holds tether 104 on one side of tree TR in a manner allowing second intermediate UAS 106b to hold tether 104 on the other side of tree TR, allowing primary UAS 108 to operate in field FT in areas where tree TR is in between ground station 102 and primary UAS 108.

Generally, one or more embodiments of the present disclosure are particularly applicable to situations which benefit from the long endurance compared to an internally powered UAS. For example, any data collection role that requires near field data (e.g. close proximity to the object of interest) will be well served by embodiments of the present disclosure. System 100 in any of the multi-segmented tether, multi-UAS embodiments provides an articulated arm for maneuvering primary UAS 108 to a data collection location that may not be reachable with an unjointed, straight arm.

Other possible fields of application for embodiments of the present disclosure will be apparent to persons of ordinary skill. Some of these applications rely on the ability to move a data collection module within an operational airspace for an extended period of time. Generally speaking such a data collection module will be lightweight but heavier than what can be carried by a similar UAS with only internal power. In other applications, a package-delivery configuration could be used to deliver packages within a defined setting, such as an industrial setting. For example, small parcels could be delivered from central inventories on a construction site to installation sites within the construction site. Generally speaking, for embodiments of system 100 using a tether, the operational airspace will extend to the length of the tether.

Use of system 100 is not limited in the fields of application in any manner. Other applications include improvements in radio communication because, in the case that one length of the tether includes a pair of wires terminated in a resistor, system may be used to rapidly assemble a Beverage-type antenna. Such system may be used for directional field communications.

Another broad field of application is entertainment including in moviemaking and motorized and non-motorized sports. E.g., system 100 may be used for cinematography in applications in place of bulky and expensive helicopter, crane, tower or track systems that are used to position and move a camera during filming of a moving object, such as cars on a motor race track. System 100 may maneuver primary UAS 108 to fly above or alongside the cars to provide aerial shots that follow along with the motion of the race cars. Such shots could be acquired in real time for the duration of the event.

System 100 may be used for herd management by ranches as an alternative to labor intensive tasks in herd management. As an example, system 100 could be mounted with a suitable payload for herding livestock in inaccessible thickets out into open pasture and/or for monitoring the health of livestock.

System 100 may be used in construction sites and other similarly dynamic, planned environments that depend on accurate geographical data, data on raw material use, and data on project progression in order to maintain projects on schedule and within budget. For example, prior to building, system 100 may be used to survey sites for construction and aid earth moving operations by providing daily colorized-3D-model of the ground profile. During the construction phase, the system could be used to collect a daily colorized-3D-model of the entire construction site. These data sets could be compared in software from day to day in order to track changes, detect anomalies, and to remind project managers of upcoming events.

System 100 may be used to conduct security of high value public assets. For example, by regularly imaging the entire surface of a bridge or other piece of infrastructure and, over time, conducting automated comparison of past and present images to detect any anomalies.

System 100 may be used in both surface and underground mining applications. Similar to the case of construction, surface mining operations depend on accurate information for efficient deployment of resources, which could be provided by system 100 continuously collecting an aerial map. Continuous 3D mapping would provide accurate forecasts of ore volumes and mining progress. The map data could also be used to enhance existing maps of ore deposits. In the case of underground mining operations, system 100 may carry out the foregoing mapping and may be particularly useful for surveying inaccessible or hazardous cavities.

In manufacturing and utilities settings, system 100 may be used for monitoring of process and equipment. As an example, for the case of a large space filled with continuously operating machinery, system 100 may be equipped with a payload including directional microphones and a thermal camera and used to create a thermal and sonic map of all the surfaces of the equipment. Successive maps may be compared at regular intervals to provide early detection of equipment failure.

In search and rescue operations, system 100 may be used to map and search through hazardous, inaccessible areas over extended periods of time, allowing more efficient deployment of rescue personnel.

Figure 13:
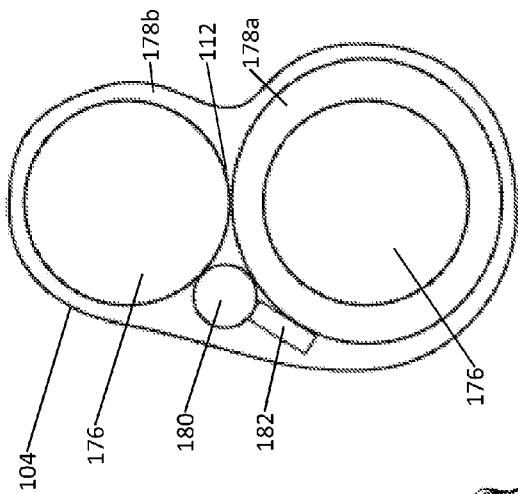
FIG. 13 is a cross-sectional view of a tether segment according to one or more embodiments of the present disclosure, showing structural layers, channels, and cables in the tether segment.
Figure 14:
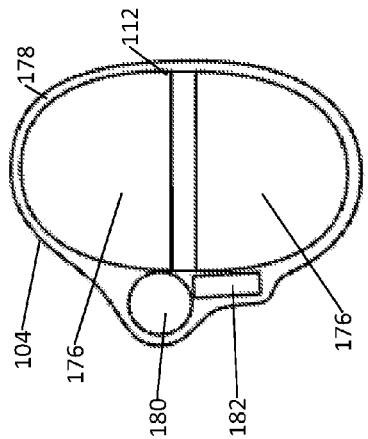
FIG. 14 is a cross-sectional view of a tether segment according to one or more embodiments of the present disclosure, showing structural layers, channels, and cables in the tether segment.

Mechanical designs for embodiments of a tether and/or tether segments between UAS's are shown in cross-section in FIGS. 13-14. Tether 104 typically is designed to optimize a light weight while remaining strong enough to withstand tensile forces expected in operation. Generally, tether 104 will include a conduit of some type for one or both of providing power and transmitting data. For example, tether 104 may include a pair of insulated wires 176. Wires 176 may be formed of any suitable electrically conductive material, such as aluminum or copper, and may be surrounded by an insulator 178, such as PTFE or polyimide. FIGS. 13 and 14 depict insulator 178 formed to surround wires 176, jointly (FIG. 14) and alternatively may be formed to surround them separately (178a and 178b in FIG. 13). The cable structure for tether 104 may include a reinforcing thread 180 and an optical fiber 182, which may be jacketless, as depicted in FIGS. 13 and 14, or provided with a jacket or other sheathing. These elements may be bound at intervals with thread, or insulated as a whole cable. The configuration of FIG. 14 may reduce insulator weight, where the conductors are semi-cylindrical and separated by a flat dielectric strip 184, formed of a suitable material.

Tether 104 may span entirely from a tether attachment point 186 at ground station 102 to attachment points on the UAS's or may be interrupted to reduce overall tether mass. As an example of an interrupted tether, tether 104 may split into two paths adjacent the attachment point of an intermediate UAS: one going directly to the intermediate UAS and another which takes a more direct path along the next leg of the tether. Reducing the electrical path to the next UAS may allow a greater load to be sustained on the transmission line of the tether.

As shown in FIGS. 1-12, for tethered operations, the airframe of UAS 106 and/or 108 typically is designed to handle tether 104 without entanglement in rotors 134 of the UAS's. Structure to carry this out may include a multirotor airframe that is provided with a rigid or semi-rigid tether standoff 130 and/or a guard 188, which may be useful in preventing entanglement and facilitating landing procedures while allowing the UAS to apply maximal forces to the tether while maintaining stable flight.

Standoff 130 may be conceived as a beam to which tether 104 may be attached. A proximal end 190 of standoff 130 may be attached to the UAS and distal end 192 may be either fixed or free to pivot over an angular range. Standoff 130 may have an added role of positioning a GPS antenna, communications antenna, magnetometer, and/or other EMI-sensitive components away from motors and power system carried on the UAS airframe within guard 188.

Embodiments of a connection point of the tether to a UAS are shown in FIGS. 1-12 and further details are shown in FIGS. 17-19a and 24-27b. A passive and/or active severing system may be provided as a safety measure adjacent the point at which the tether connects to an airframe of a UAS. Figs. A passive severing system may include a detachment point near the connection point operable under excessive mechanical tension or electrical current to sever at these points. Operation of the severing system may reduce operational costs by allowing the tether to be reused. An active severing system may be provided for severing the tether when commanded by an onboard UAS controller, for example, if a fault is detected or a collision of the tether is imminent.

Figure 18A:
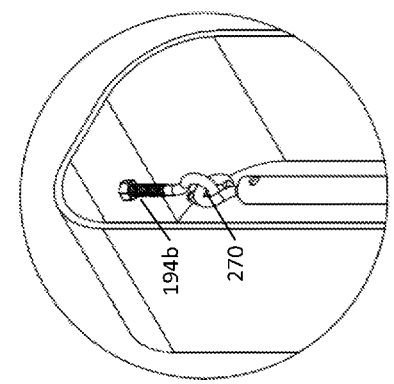
FIGS. 18 and 18a are an isometric view and a detail view of that showing an airframe similar to FIGS. 16 and 16a with the universal joint using two eyebolts.
Figure 18:
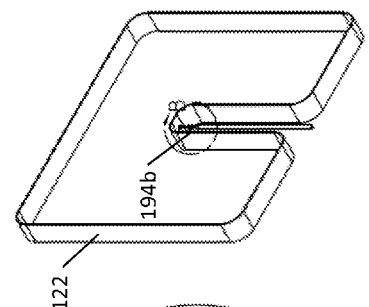

Embodiments of airframe 122 and connection points for standoff 130 may be seen in FIGS. 4-6 and 17-19a. As described above, rotors 134 may be enclosed in rigid frame 136, defining rectangular perimeter 140 with slot 142 through which tether standoff 130 may pivot. Slot 142 defines a U-shape that may provide a mounting point 194 (194a in FIGS. 4-6, 194b in FIGS. 17-18a. 194c in FIGS. 19-19a, and 194d in FIG. 27) for a pivoting joint 196 where the tether standoff meets the airframe. See also FIGS. 24-25c. Pivoting joint 196 may allow either one (e.g., FIGS. 4-6) or two (e.g., FIG. 27) axes of rotation. The degree of freedom provided by such axes of rotation may be equivalently provided by forming standoff 130 of a semi-rigid material to allow torsional flexing while maintaining adequate resistance to stretching and compression along the length of standoff 130.

A single-axis pivoting joint 196a is shown in FIGS. 24-24c, where a bracket 198 may include a first cylindrical cavity 200 and a second cavity 202. First cavity 200 may be configured to receive a bushing 204, formed, e.g., of PTFE. Proximal end 190 of standoff 130 may be fixedly received in second cavity 202 of bracket 198, and wires or other conduits may extend from tether 104 through proximal end 190 of standoff 130. Bushing 204 may include a cavity 206, which may be configured to receive a tube 208, formed, e.g., of a composite material. Tube 208 may be fixedly connected to airframe 122 at the connection point, allowing bushing 204 and bracket 198 to rotate about tube 208 and to allow standoff 130 to pivot up and down relative to airframe 122. Within bracket 198, first cavity 200 may be open to second cavity 202, allowing passage therethrough of one or more wires or other conduits carried by tether 104 and standoff 130 into airframe 122 for connection to electronics and other equipment in airframe 122. Bushing 204 may include an opening 210 in communication with cavity 206. Tube 208 may include an opening, e.g., slot 212 in communication with an internal cavity 214, the cavities and openings of the bracket, bushing, and tube thus allowing for passage of wires or other conduits from standoff 130 of tether 104 to equipment in the UAS.

A dual-axis pivoting joint 196b is shown in FIGS. 25-25c, where a bracket 216 may include a first cylindrical cavity 218 and a second cavity 220. First cavity 218 may be configured to receive a bushing 204a, formed, e.g., of PTFE. Bushings 204 and 204a may be interchangeably used in joints 196a and 196b, with bushing 204a being a lighter weight version of 204 formed by providing multiple openings 210. Proximal end 190 of standoff 130 may be received in second cavity 220 of bracket 216, and wires or other conduits may extend from tether 104 through proximal end 190 of standoff 130. Cavity 220 includes a pivot point 222 and a pivot area 224 allowing for pivotal mounting for side-to-side movement of standoff 130. A stainless steel cotter pin may be provided at pivot point 222 for coupling standoff 130 to bracket 216. This is an example of how the stand-off joint may be coupled to the frame of the aerial vehicle by a universal joint formed by a pair of pivot joints with axes that are substantially orthogonal.

Similar to FIGS. 24-24c, in the embodiments of FIGS. 25-25c, bushing 204a may include cavity 206, which may be configured to receive tube 208, formed, e.g., of a composite material. As in FIGS. 24-24c, tube 208 may be fixedly connected to airframe 122 at the connection point, allowing bushing 204a and bracket 216 to rotate about tube 208 and to allow standoff 130 to pivot up and down relative to airframe 122. As in FIGS. 24-24c, within bracket 216, first cavity 218 may be open to second cavity 220, allowing passage therethrough of one or more wires or other conduits carried by tether 104 and standoff 130 into airframe 122 for connection to electronics and other equipment in airframe 122. Bushing 204a may include opening 210 in communication with cavity 206. As in FIGS. 24-24c, tube 208 may include slot 212 in communication with internal cavity 214, the cavities and openings of the bracket, bushing, and tube thus allowing for passage of wires or other conduits from standoff 130 of tether 104 to equipment in the UAS.

Brackets 198 and 216 may be formed using a lightweight and durable design, e.g., by fabricating from tapes of aramid fabric as will be described below for the main structure of the airframe. A structure for a mold 226 for the two-axis joint of FIGS. 25-25c is shown in FIGS. 26-26b.

Figure 15:
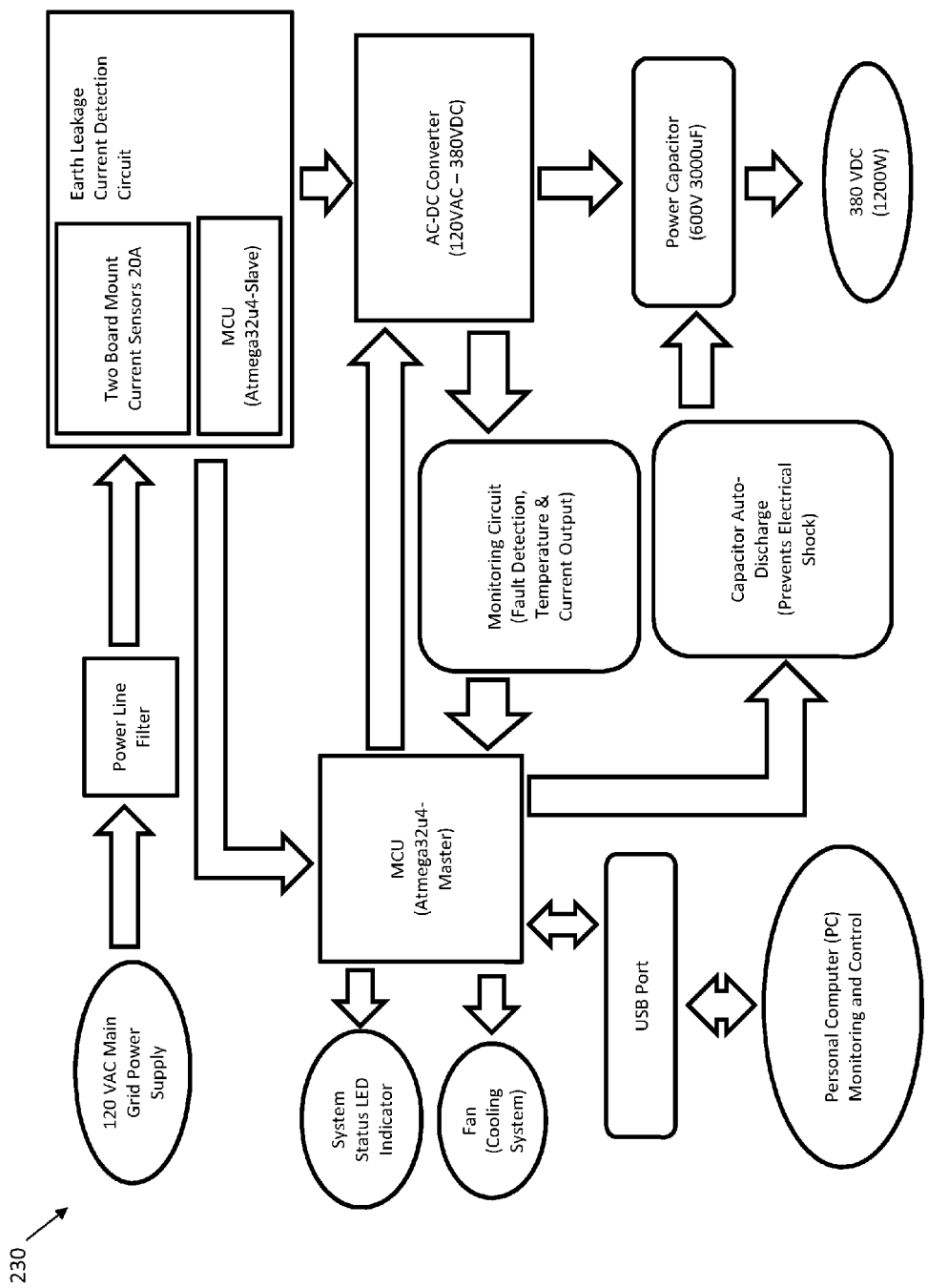
FIG. 15 is a block diagram of power supply and monitoring circuits for use in a ground station according to one or more embodiments of the present disclosure.
Figure 16:
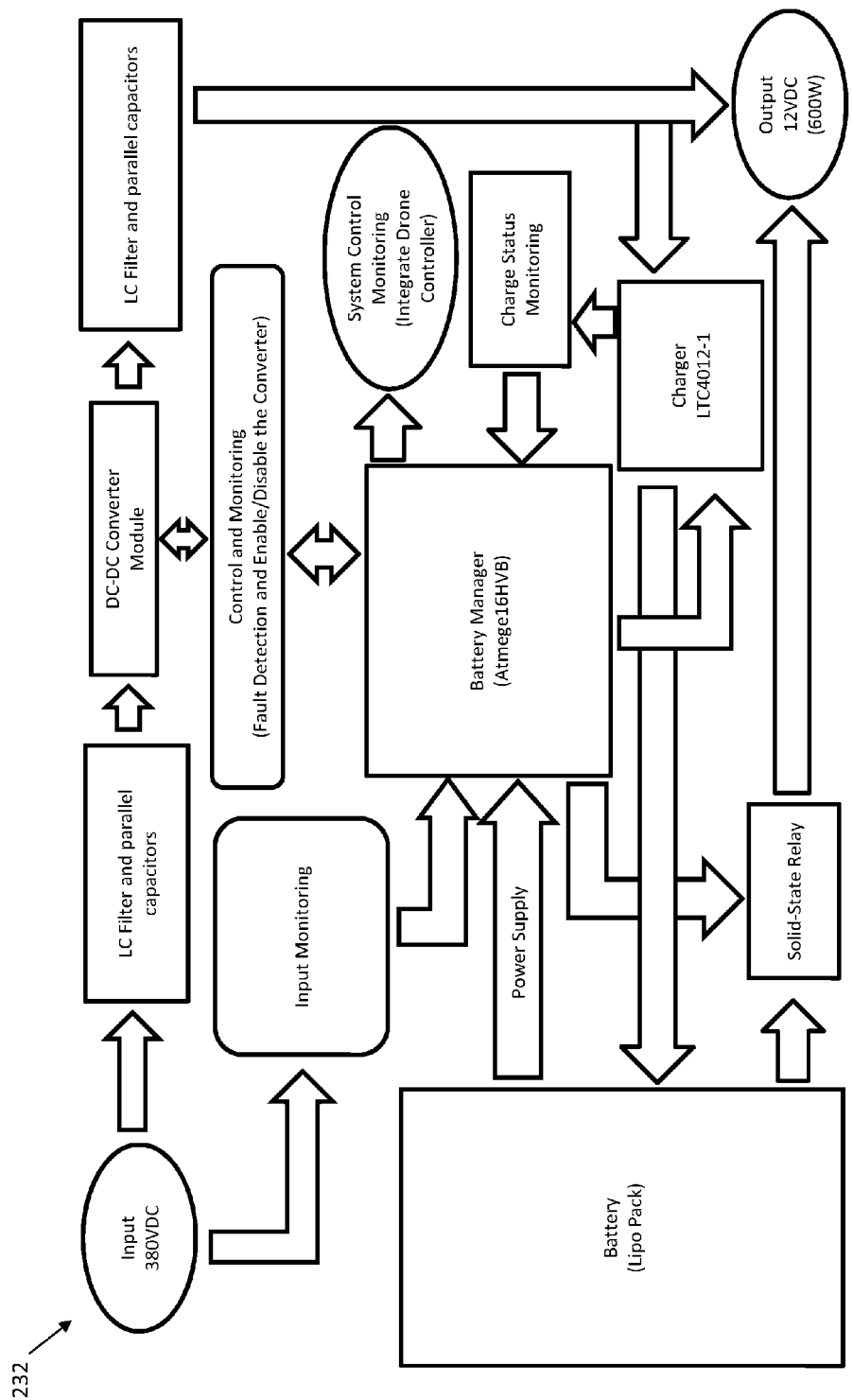
FIG. 16 is a block diagram of power supply and monitoring and battery management circuits for use in an aerial vehicle according to one or more embodiments of the present disclosure.

FIGS. 15-16 depict a system 228 for monitoring and transforming electrical power for transmission along tether 104, in order to deliver power to the motors and avionics of one or more tethered UAS's. System 228 consists of a ground unit (230, FIG. 15) and a UAS power unit (232, FIG. 16). Ground unit 230 may be powered from mains electricity and provide power to a monitor and control computer, e.g., through a USB connection. Ground unit 230 may provide power, e.g., at an approximately 380 VDC output voltage, to supply UAS's along the tether. UAS unit 232 may convert the tether voltage to a more readily useable voltage for airborne motors and computer (typically approximately 12 VDC).

Ground power unit 230 may include an electronic system that filters, monitors, transforms, rectifies, and switches the tether power, e.g., as depicted in the block diagram of FIG. 15. The state of an AC-DC converter subunit (which transforms, rectifies, smooths, and regulates the voltage for the tether) may be monitored by a microcontroller unit MCU, which may receive converter faults, temperature, and current output from the converted through a monitoring circuit. The MCU may use this information to control the temperature of the converter by use of a fan and provide system status indications on LEDs. A main output filter capacitor, e.g., a 600V, 3,000 µF capacitor may be provided with an automatic discharge circuit to avoid leaving a high voltage on the capacitor when the tether is powered off. System 228 may incorporate numerous safeguards such as detection of leakage currents to earth, and may allow for control of the power through the monitor and control computer, e.g., a personal computer. This configuration may enable PC-based controller software to quickly and automatically power down the tether if a high risk scenario is detected.

UAS power unit 232 may include an electronic system and mechanical enclosure that is preferably designed to be lightweight while delivering stable power to the UAS. As noted above, the electronic system may filter and convert the voltage from the tether to a voltage more readily useful for the UAS, e.g., 12 VDC. The electronic system may use excess power to maintain and balance charge on airborne power storage, e.g., a battery such as a three cell lithium ion battery that may be provided in a Lipo pack. The electronic system may draw power from the battery for the UAS in the case that the tether power is interrupted. The electronic system may notify the flight computer in the case of such an interruption. The system may be designed to accept a wide range of input voltages (e.g., about 250 to about 380 V) permitting a continuous delivery at the output of UAS power unit 232 of the current requirements of the UAS. E.g., the UAS unit may provide power at a current of about 43-Amps.

UAS unit 232 may incorporate a heat management design that includes a thin encapsulating layer of high-thermal-conductivity epoxy for joining circuitry to one or more power dissipating elements, e.g., a set of aluminum fins. The power dissipating elements may be designed to conform to the topography of the circuit elements, thereby maximizing heat transfer. Positioning and/or mating of the circuit elements and power dissipating elements may be controlled by a tool during the setting of the epoxy. Power dissipating fins may be provided with a die or laser cut construction and may be welded and/or fastened to improve the structural integrity of the heat-sink-epoxy-PCB assembly.

The tether power system is typically designed for efficient, safe, and cost-effective delivery of ample DC power to one or more UAS(s) at voltages typical of safe industrial environments. System 228 may take advantage of naturally high airflows in the UAS's to dissipate heat with minimal added mass. Ground power unit 230 and UAS 232 may be hermetically encapsulated to promote reliable functioning.

A sensor system 234 of a UAS may include camera system 154. More generally, sensor system 234 may include an obstacle sensor and/or a position sensor and/or an attitude sensor. An obstacle sensor may include camera-based sensor 154, and cameras 154 may alternatively or in combination include a laser-based sensor, a radar-based sensor, a LIDAR-based sensor, an acoustic-based sensor, or any sensor suitable for the particular obstacles to be sensed. E.g., an embodiment of system 100 intended for operation in cloudy and/or foggy and/or smoky, and or nighttime conditions may add to, or replace the optical camera sensors with the radar-based sensor for operation where suspended water vapor, smoke, dark, or other conditions limit the usefulness of optical camera sensors.

Examples of suitable position sensors include a GPS unit, an inertial navigation unit, an inertial measurement unit, a barometer, or any sensor suitable for developing information about aerial vehicle position for a particular application. As seen in FIG. 12, a GPS unit 236 may be mounted to airframe 122 and other position sensors may generally be mounted in a corresponding manner.

Examples of suitable attitude sensors include a magnetometer, an accelerometer, a sun sensor, or any attitude sensor suitable for a particular type of vehicle and use. As described above for FIG. 12, sun sensor 156 may be mounted to airframe 122, and other attitude sensors may be mounted in a corresponding manner.

A mechanical structure for airframe 122 may be made from an aramid-epoxy composite material, or any suitable material for meeting the requirements of a particular application for lightweight and structural strength. Such structure of aramid-epoxy composite material may formed by applying tapes of aramid fabric to an aluminum mold, saturating the fabric with epoxy, and applying heat and pressure to cure the epoxy. One or both of two-inch wide tape and one-inch wide tape may be useful in such a process for a typically sized airframe. Such process may be carried out by hand using standard tools and techniques and may alternatively by carried out by CNC machinery. A mold useful for such operation may, e.g., be machined from a solid aluminum plate to have surfaces corresponding to the structures described for FIGS. 4-6 and 27-27b. Surfaces on such mold that will receive the tape may be polished and/or buffed to facilitate release of the tape from the mold after curing. The cured structure may be machined as necessary, particularly at internal radii, for a suitably smooth airframe.

As shown in FIGS. 4-6 and 27-27b, airframe 122 may, e.g., include band 138 around a substantially rectangular perimeter 140. Band 138 for a typical application may be about ~2" in height. Perimeter 140 may include a U-shape 242 extending into perimeter 140 from one of four edges 244 toward a central, bridging area 246. As described above, four arms 166 may extend toward corners 162 of perimeter 140 from bridging area 246. Each of arms 166 may support a motor 128 and a camera 154. Arms 166 may, in a typical UAS, be made from four layers of 0.01" thick, 1" wide aramid cloth, and perimeter 140 and bridging area 246 may be made from four layers of 0.01" thick, 2" wide aramid cloth. In alternative embodiments, the fabric may be carbon fiber, and the perimeter may be fabricated from multiple narrower tapes so as to allow air to flow through this perimeter, or otherwise to improve aerodynamic performance.

As seen in FIG. 27, external band 138 may have openings 252 formed by cutting or machining out the strips. Machining might be more suitable for carbon fiber because it does not fray as much as aramid strings or strip. Alternatively openings 252 in band 138 may be formed by originally forming band 138 of upper and lower strings 254 as in FIG. 12. Such strings 254 may have structural strength by being tensioned between corners 162, in which case such strings operate as stays spanning arms 166. Strings 254 may be tensioned in opposition to U-shape slot structure 242, which may act as a cantilever in such construction to allow for weight savings while preserving the rigidity of the airframe.

Further, an aramid-epoxy structure may contain embedded metallic structural members formed by a tool-die process, and which may be designed to transfer compressive or concussive loads to the aramid material by means of teeth, surface modification, or fasteners.

In embodiments of system 100, each combined motor 128 and rotor 134 are spaced apart horizontally from other motor-rotor combinations. Each rotor 134 may be configured to spin about a substantially vertical axis VA during flight of the UAS, and the substantially vertical axes may be spaced apart horizontally from one another. Airframe 122 may include structural frame 126 defining four corners 162 and four substantially straight outer edges 244 interconnecting corners 162. Each rotor 134 may be located adjacent one of the corners 162. Outer edges 244 of frame 162 may provide a structure for preventing contact of rotors 134 with segments of tether 104. Standoff 130 may also provide structure for preventing contact of the rotors with the tether segment.

As described above, frame 162 may define planform 160, and such planform may be substantially quadrilateral, e.g., rectangular, and may surround rotors 134 to prevent contact of the rotors with the tether segment. As may be best seen in FIG. 11, slot 142 in planform 160 may allow the UAS to fly level with or below the tether segment. Standoff 130 joint may be pivotally coupled to the UAS at joint 194 for movement through slot 142.

One or more algorithms executable in one or both of the ground-based and airborne processor may be operational for deciding optimal position(s) of intermediate UAS's depending on the desired location or flight plan of the primary UAS.

An algorithm 'getauxpose' may take as input the position and orientation of the primary UAS, the starting positions of the intermediate UAS's, and information about scenario, including parameters such as the weight and lengths of the tether segments joining the UAS's and the known static obstacles in the environment. The 'getauxpose' algorithm may compute the optimal pose(s) of the intermediate UAS's by performing a constrained optimization of a cost function 'posecost.' The 'posecost' function may serve as a measure of the safety and desirability of any given position of the entire aerial system including tethers and aerial units.

The cost function 'posecost' may contain an algorithm that calculates, for any given position/orientation of the intermediate UAS's: the positions of the tethers based on the UAS positions, the forces which the tethers exert on the UAS's, the proximity of the tethers to the ground plane and to any obstacles. From these data, a cost may be calculated according to the formula contained in the function definition, which assigns, for example, a high cost to the tether being twisted, a high cost to the expected tether position falling below the ground plane, a high cost to the tether approaching obstacles, a high cost to the tethers being stretched so as to apply large horizontal or vertical forces to the aerial units, and a high cost to the tethers assuming a position in which it is possible that they will be drawn into the rotors of the unit. Quantitative details as to how these costs are calculated from given values may be contained in the function definition. The calculation may rely on constant weighting parameters, which may be determined by manual training of the system to avoid collisions, or through an automated training process.

Thus, processor 172 in a UAS may calculate a cost function based on the flight characteristics of the UAS and the obstacles in the air space. The UAS may communicate with the ground station with the processor in the UAS providing the cost function to flight control processor 114 in ground station 102. Flight control processor 114 may be configured to optimize the cost function for control of the UAS.

If computational resources are limited, the calculation process may be accelerated by allowing the primary UAS to navigate freely without computing the optimal intermediate UAS position(s) until the cost of the entire aerial configuration, as computed by the cost function described above, becomes higher than a certain threshold, at which point the constrained optimization algorithm may execute and the intermediate UAS's may be relocated.

Figure 30:
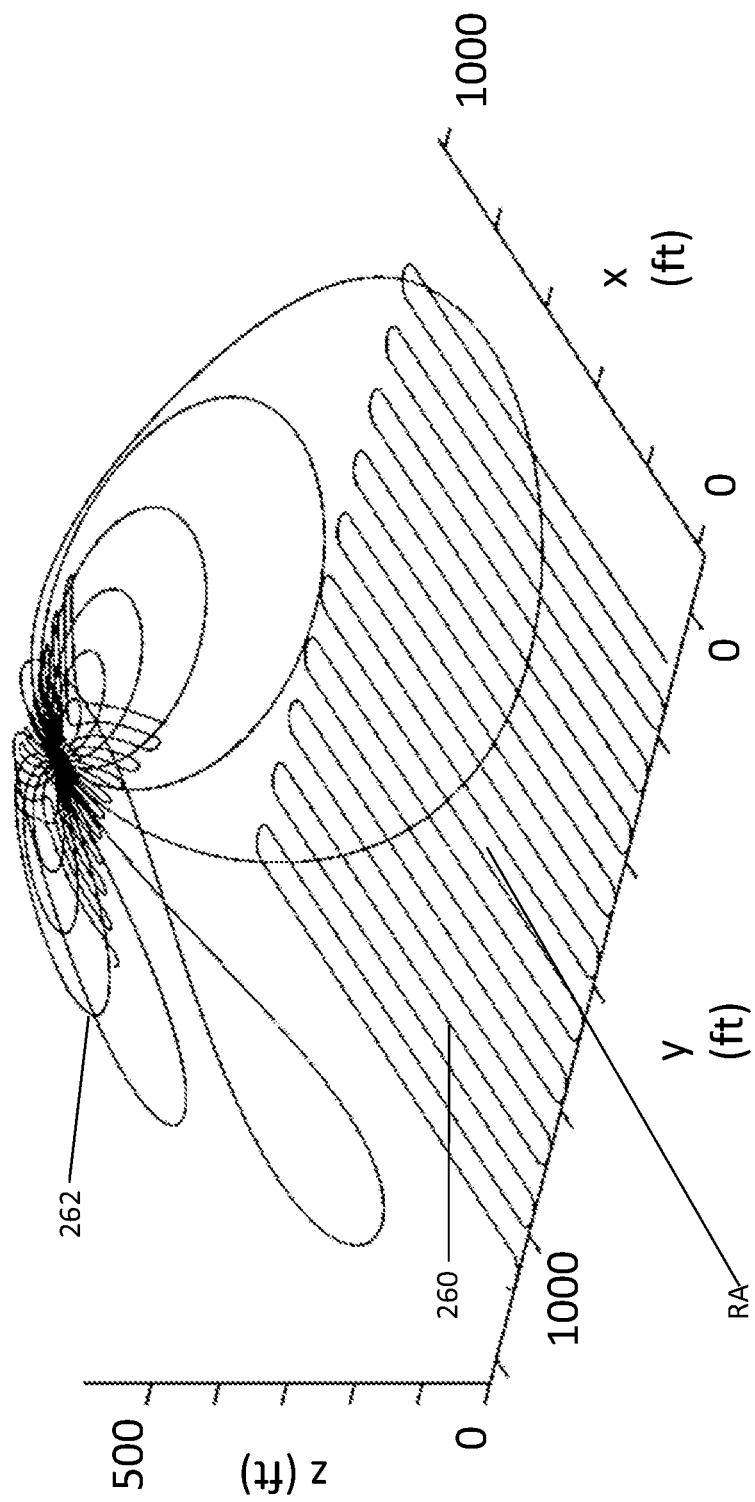
FIG. 30 is a three-dimensional graph of an exemplary flight path for each aerial vehicle in a two-vehicle system.

FIG. 30 shows a set of flight plans for system 100 with an intermediate UAS 106 and a primary UAS 108 for data-gathering over a substantially rectangular area RA. The flight plan for primary UAS 108 is a flight path 260 that is a series of substantially straight passes across a width of area RA that progress along a length of area RA. Meanwhile, the flight plan for intermediate UAS 106 is a flight path 262 that repeatedly sweeps in a curved fashion across the width of area RA, also progressing along the length of area RA in a manner that moves tether 104 to facilitate the passes being conducted by primary UAS 108.

System 100 may alternatively operate in an untethered configuration to maneuver payload 110 in an air space constrained by one or more obstacles. Payload 110 may be coupled to airframe 122 in any manner suitable to the particular application(s) of the system. For example, standoff joint 130 may, in place of, or in addition to its role of connecting the airframe to the tether, may provide a support and attachment point for payload 110 to airframe 122.

UAS 108 in the untethered configuration will carry sensor system 234, which may be carried by the aerial vehicle and may be coupled to processor 172 in UAS 108. Sensor system 234 may include a plurality of sensors operable to gather data about obstacles in the air space and to provide the data to the processor, e.g., cameras 154 pointing outward from airframe 122. As described above, each camera 154 pointing outward from airframe defines a mono field of view 168, and, in the four-cornered arrangement, the field of view of each camera overlaps with the two adjacent fields of view to form a total of four stereo FOV's 170. Alternatively an array of just two or three cameras, or more than four cameras may be arranged pointing outward from the airframe of the vehicle, as suitable to a particular application.

Tether 104 may for a transmission line for power and data. Typically, then ground station 102 may provide along tether 104 to the UAS's: power, precise pose information, one or more flight plan(s), flight control parameters, and payload commands; and may receive from the UAS's along tether 104: payload data and raw pose data for calculation and processing to develop the data and instructions to send back to the UAS's.

Figure 38:
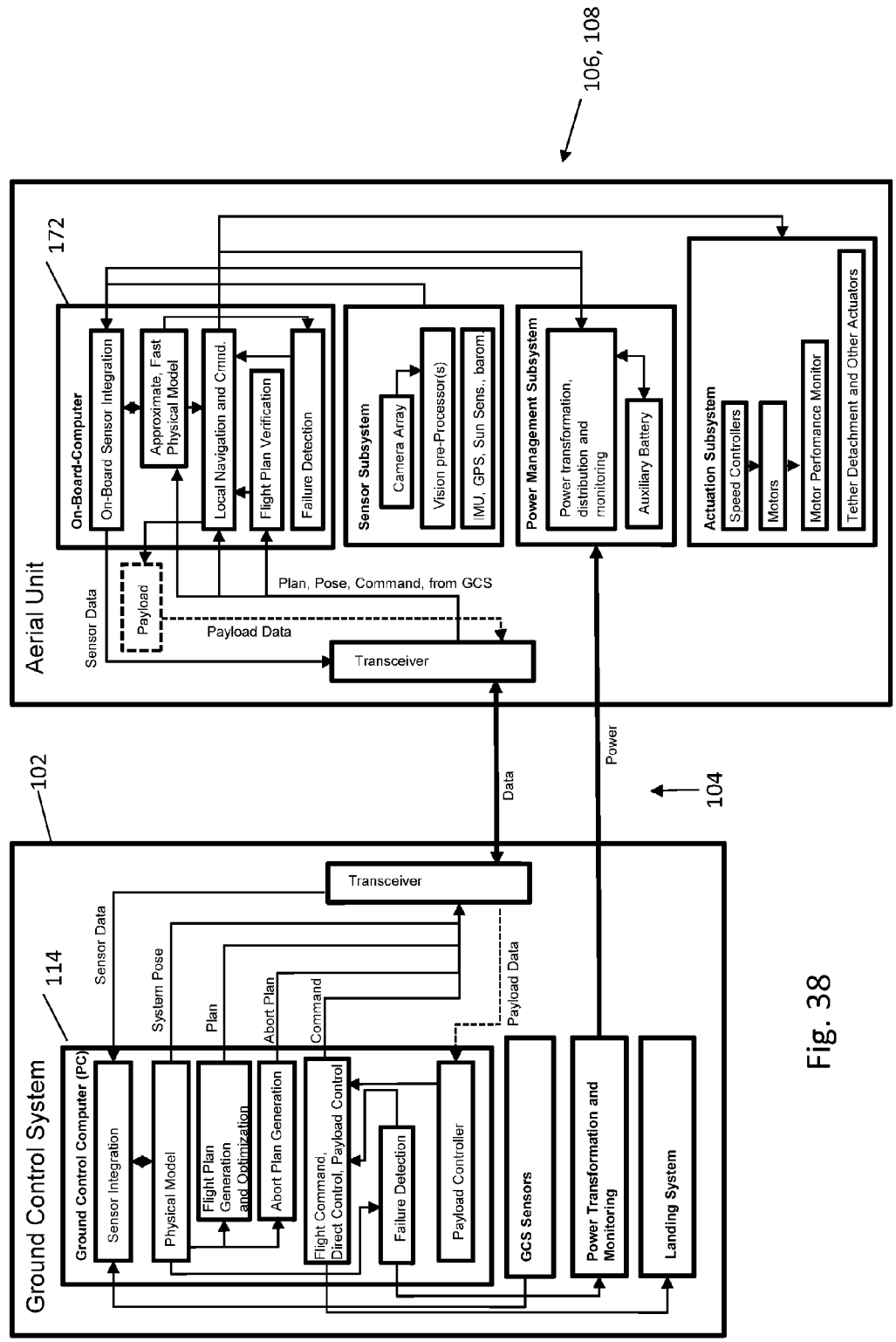
FIG. 38 is a block diagram of the ground station and one of the aerial units showing the computers, sensors, and power systems in each, and the tether connecting the two, and the landing system associated with the ground station and the actuation system of the aerial unit.

Software for ground station 102 may include:
Sensor integration
Precise physical model
Flight plan generator
Flight control
Abort plan generator
Hardware for ground station 102 may include:
Personal computer
Ground Control Station (GCS) sensors
Data transceiver
Power transformer
Landing system
Software for intermediate UAS 106 may include:
Approximate physical model
Local and emergency navigation
Flight control
GCS flight plan verifications
Hardware for intermediate UAS 106 may include:
On board computer
Pose sensors
Data transceiver
Electrical motors
Tether management
Power Converters and management
Auxiliary battery
Software for primary UAS 108 may include:
Approximate physical model
Local and emergency navigation
Flight control
GCS flight plan verifications
Payload software
Hardware for primary UAS 108 may include:
On board computer
Pose sensors
Data transceiver
Electrical motors
Tether management
Power Converters and management
Auxiliary battery
Payload Power Converter
Payload Under typical, normal operations, flight control may be shared between ground station processor 114 and airborne computer(s) 172 on-board the UAS's. Typically, ground station 114 will be responsible for performing all flight control decisions for which the network latency is acceptable. Using the data currently at its disposal, ground station processor 114 may issue to airborne computers 172 the estimated pose of the system, optimal and acceptable future flight states, flight control parameters based on real-time simulation in ground station processor 114, data collection commands, and emergency maneuver commands. Airborne computers 172 may check the timeliness and safety of the commands from the ground station and either execute these commands, operate within acceptable bounds, or perform autonomous stabilization or abort procedures. FIG. 38 depicts the system, including the ground station and an exemplary aerial unit with the data link, which may be wired or wireless, and the power link between the two. Additional aerial units connected in series or in parallel with the first aerial unit. The ground station's processor may include a ground control computer, as depicted in FIG. 38 with software operable on the computer for sensor integration, and for a physical model including flight plan generation, and abort plan generation, in case, e.g., of tether separation. Ground station computer software may also include flight command, direct control, and payload control. Flight command may include high level commands to select between modes such as manual control; abort; follow flight plan x; launch; land; de-energize tether; and/or other modes. As shown in FIG. 38, communication between the physical model and the flight command may include the physical model telling the flight command when to switch to an abort mode. In other modes, the physical model generates and optimizes the flight plan and the flight command in the aerial unit (i.e., Local Navigation and Cmnd.) executes this flight plan.

Inputs and outputs of the ground station software may be communicable via transceivers with the one or more aerial units. The ground station may also include sensors, power transformation and monitoring, and a landing system as described above and depicted in FIG. 38, coordinated with the other software operable in the ground station computer.

Each aerial unit's processor may include an on-board computer with software operable for on-board sensor integration, and a physical model of flight characteristics. Typically, the physical model in the aerial unit's processor is an approximate, fast model as compared to the physical model maintained in the ground station processor. In the aerial unit, local navigation and flight command may be combined together, determining both high level flight modes. Local navigation and flight command may also perform direct control of motors to follow the flight plan coordinates. The aerial unit's processor may receive flight plan, pose, and command information from the ground station for local navigation and command. The aerial unit's processor may carry out flight plan verification and failure detection. The aerial unit may include a sensor system as described above and depicted in FIG. 38, which may include vision preprocessors for the camera array. The aerial unit may also include a power management subsystem with power transformation, distribution and monitoring coupled to an auxiliary battery. An actuation subsystem in the aerial unit may include speed controller(s), motor(s) with performance monitor(s), and tether detachment actuators as well as other actuators, e.g., for payload operation and/or sensor operation.

Ground station processor 114 is configured to maintain and update in real-time a physical model of system 100 based on the most current and reliable data. Data from sensors, such as the array of cameras 154 may be integrated to model the flight environment and provide a channel of pose estimation using computer vision routines. Sensor-based information, such as vision-based pose estimation, GPS, magnetometer, accelerometer, barometer, sun sensor, and tether transducer data streams may be filtered and then monitored and cross-referenced for indications of temporary or extended loss of reliability. The physical model may be updated on the basis of the best data.

On the basis of this physical model, ground station processor 114 may maintain optimal control parameters which may be issued to airborne computers 172, as described above. Ground station processor 114 may also maintain and update in real-time a primary flight plan for the system based on the initial flight plan, the current state of the physical model, and current operator commands. The flight plan may be chosen to minimize a quantity which reflects: the likelihood of entanglement of the tether with obstacles and rotors; the likelihood of overloading a UAS with tether forces; the number of twists introduced into the tether segments, and other similar parameters.

Ground station processor may maintain and update in real-time abort flight plans based on the current state of the physical model. A primary abort flight plan may be designed to land the system at or near the ground station in a timely and safe manner. A 'severing abort' flight plan may provide a plan to return the UAS units safely to the ground station for the case that a tether severing operation is performed.

Figure 32:
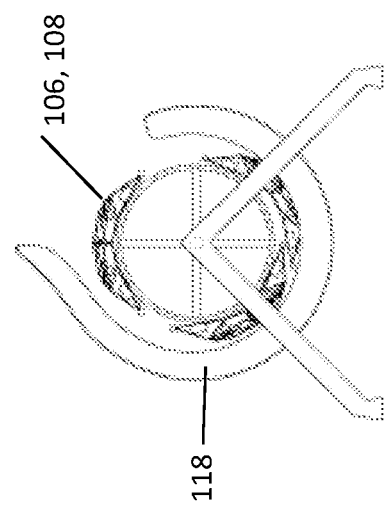
FIG. 32 is a side view of the spool of FIG. 31, showing a completed winding of tether segments and aerial vehicles onto the spool.
Figure 31:
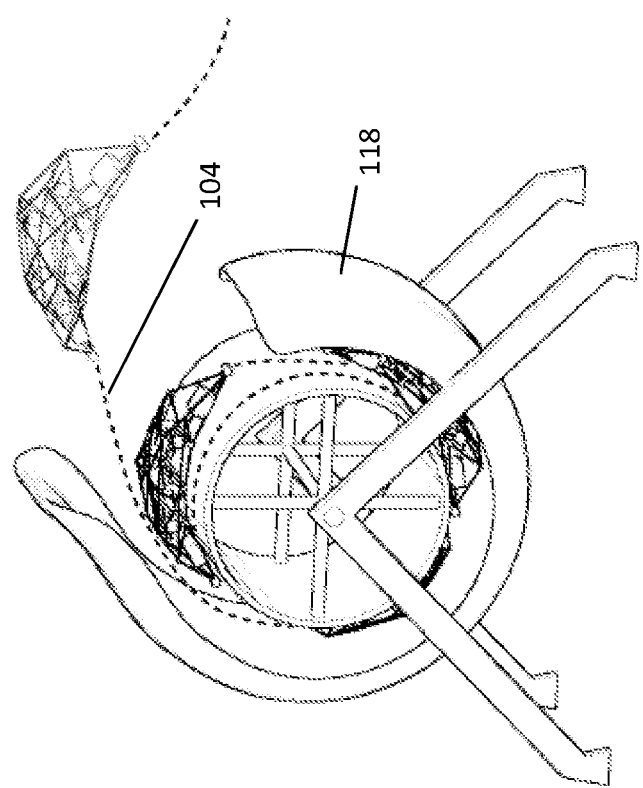
FIG. 31 is a perspective view of a spool for a system using aerial vehicles as in FIGS. 7 and 8 aimed at expediting landing and launch operation by allowing the tether and UAS units to share a single large spool, showing the tether segments and an aerial vehicle being wound onto the spool.

As shown in FIGS. 31-37, various approaches may be used with embodiments of the present disclosure for landing the aerial portions of the system on the ground and for handling the tether while on the ground. FIGS. 31-35 depict landing systems and associated tether and UAS construction. FIGS. 31-32 shows an embodiment of ground-based spool 118, e.g., while spooling (FIG. 31). FIGS. 31-32 also shows that spool 118 may be combined with the airframe of FIG. 7-8 in a manner that may expedite landing and launch operation by allowing tether 104 and UAS units 106 and 108 to share a single large spool. FIG. 32 shows tether 104 and UAS units 106 and 108 completely wrapped onto spool 118. A typically size for spool 118 is about 2-feet in diameter.

FIG. 33 shows an airframe with a mechanical structure that may deploy and serve as a spool during landing operations, e.g., by the UAS flying in path that rotates the airframe about a central vertical axis of the UAS. FIGS. 34 and 35 show that several of the structural members of this type of airframe may contain threads or elastic elements which can be pulled by a single actuator to deploy the airframe. The spool-like design, allowing the UAS to shorten the tethers by rotating around its vertical axis, may facilitate landing operations in close quarters.

Figure 37:
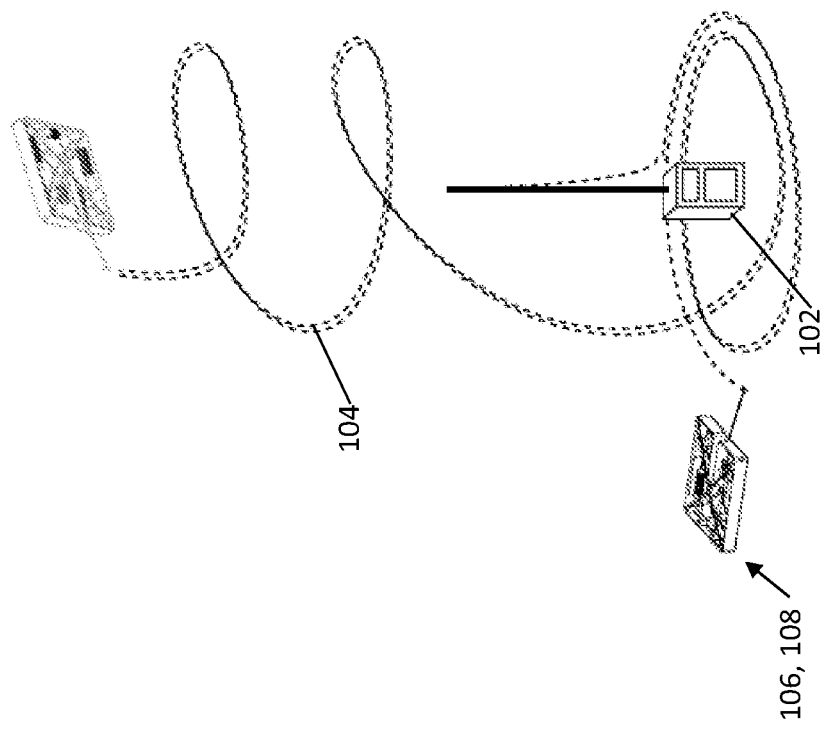
FIG. 37 shows the system of FIG. 35 where one of the two vehicles has already landed and the next vehicle along the chain remains airborne while executing a helical trajectory downwards in order to coil the tether.
Figure 36:
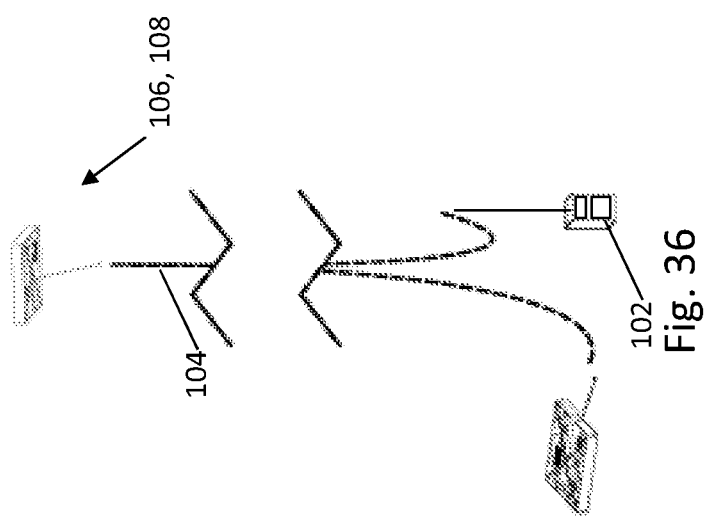
FIG. 36 shows a system using two aerial vehicles and a ground station, illustrating a tether landing operation by a spin-down maneuver.

FIGS. 36 and 37 show tether landing operation by a spin-down maneuver. For example, FIG. 36 shows a system with at least two UAS's where the primary UAS has already landed adjacent ground station 102. Then, as shown in FIG. 37, the remaining UAS's are sequentially landed while executing a helical trajectory downwards in order to coil the tether around the ground station.

As described above, flight control processor 172 may receive data from cameras 154 and process the data using a scene reconstruction process, including one or both of a stereophotogrammetry process and an optical flow process. Additionally, the processor may use a key frame bundle adjustment in calculating at least one vector to at least one obstacle and/or a trajectory of the aerial vehicle. Processor 172 in an aerial vehicle may include more than one processing units, e.g., a camera processing unit for processing data from each camera and a processing unit for integrating data from the camera processing units to calculate a navigation solution of the aerial vehicle. The lower power video processor commercially available under the Myriad 2 name, noted from may be used in processing camera data, e.g., graphical processing.

Figure 19A:
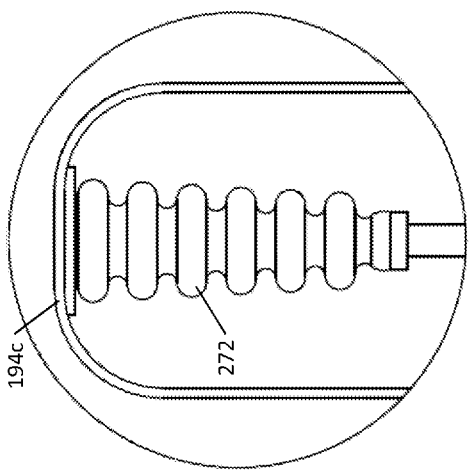
FIGS. 19 and 19a are an overhead view and a detail view of that showing an airframe similar to FIGS. 4-6 with a universal joint using a flexible rubber coupler for a stand-off joint for a tether segment to an aerial vehicle in a slot in the airframe.
Figure 17A:
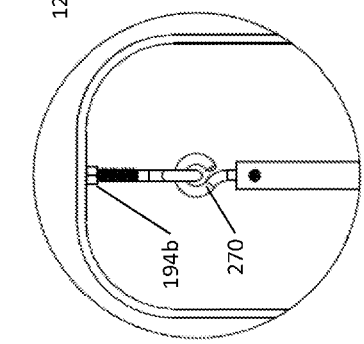
FIGS. 17 and 17a are an overhead view and a detail view of that showing an airframe similar to FIGS. 4-6 with a universal joint using two eyebolts for a stand-off joint coupling a tether segment to an aerial vehicle in a slot in the airframe.
Figure 19:
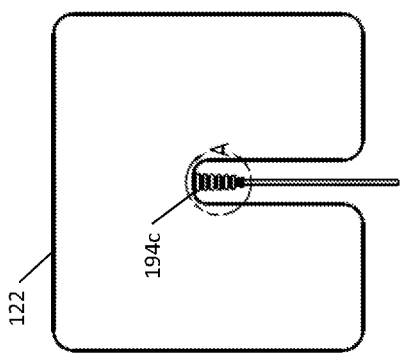
Figure 17:
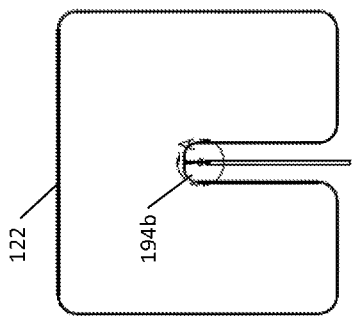

FIGS. 17-19*a* show that a universal joint between a tether segment and the airframe of a UAS may be formed adjacent mounting point 194 by a pair of eyebolts 270 (FIG. 17-18*a*) or by a rubber boot 272 (FIGS. 19-19*a*).

In the embodiment of the airframe depicted in FIGS. 7-8, rotors 134 of the UAS may be enclosed by a truss-like frame 280 of thin structural members 282, typically to provide a rigid frame. As described above, an overall shape of frame 280 is curved and tapered towards the front and back. An aspect of this frame shape is that it may allow the UAS to conform to a cylindrical spool (such as spool 118 as best seen in FIGS. 31-32). This frame shape may also help to avoid ensnaring on obstructions. Electronics are mounted in this frame, typically concentrated in enclosures 284 in the front and rear, which may lower the center of mass of the UAS. In this frame type, the tether attachment points may be provided at the front and rear of the airframe. As noted above, in relation to FIGS. 9-11, different frame types may be used for the primary UAS and for the intermediate UAS's and may be combined in the same system.

FIGS. 20-23 depict airframes that may be used in one or more embodiments of the present disclosure. Airframe 122 in FIGS. 20-21*c* may include outer frame 136 that may surround the vehicle's rotors, similar to FIGS. 4-6: outer frame 136 may include band 138 defining rectangular perimeter 140 defining four corners 162 and four substantially straight outer edges 244 interconnecting corners 162; perimeter 140 may include a U-shape 242 extending into perimeter 140 from one of four edges 244; and U-shape 242 provides a slot through which a tether standoff may rotate. However, FIGS. 20-21*c* illustrate that band 138, rather than being substantially vertical as in FIGS. 4-6, may be sloped, e.g., by having an upper edge 302 defining a larger rectangle while a lower edge 304 defines a smaller rectangle. Within U-shape 242, a slot 306 may be narrower at an upper edge 308 and wider at a lower edge 310, which may provide for tighter guidance of the tether standoff when above the aerial vehicle compared to when it is below the aerial vehicle.

FIGS. 22-23*c* depict an airframe similar to FIGS. 20-21*c*, except that a leading edge 312, opposite a trailing edge 314 adjacent slot 306, may be sloped in an opposite direction. The airframe of FIGS. 22-23*c* may provide improved aerodynamics, particularly when flying in the direction of leading edge 312.

An alternative structure for a landing platform may include a rod configured to capture the UAS units. An airframe for such a landing platform may include a hole, e.g., a centrally-located, vertical bore, which may be caught by a rod or other guide extending from such landing platform that forms a part of a landing system. In use of such a system, either before or after capture, the UAS may spin to coil the tether beneath it within a portion of the landing system, e.g., in an adjacent tube or other structure. In the case of the rod having a substantially conical shape, each UAS unit may include a differently sized or shaped bore, causing each to rest at a different point on the guide.

For some applications it may be desirable to deploy the UAS units of the system rapidly. A rapid launch system that may relate to the aforementioned landing platform may include a spring-loaded UAS launch tube, e.g., with square cross section, and a parallel, adjoining cylinder in which the tether segments are coiled and separated. A fin may be provided on the UAS unit, which may stabilize the UAS unit while launching.

What is claimed is:

1. A system for maneuvering a payload in an air space constrained by one or more obstacles, the system comprising:
- a first aerial vehicle defining a plurality of flight characteristics and having a processor for handling data about the flight characteristics of the first aerial vehicle;
- a second aerial vehicle configured to carry the payload, the second aerial vehicle defining a plurality of flight characteristics and having a processor for handling data about the flight characteristics of the second aerial vehicle;
- a first sensor system carried by one of the first and second aerial vehicles, the sensor system coupled to the processor in the one of the first and second aerial vehicles that is carrying the first sensor system, the sensor configured to gather data about obstacles in the air space and to develop data about flight characteristics of at least one of the first and second aerial vehicles, the sensor system configured to provide the data to the processor to which the sensor system is coupled;
- a ground station having a flight control processor configured to maintain a first dataset about obstacles in the air space and a second dataset about flight characteristics of the first and second aerial vehicles;
- a first tether segment coupling the ground station to the first aerial vehicle;
- a second tether segment coupling the second aerial vehicle to the first aerial vehicle.

2. The system of claim 1 wherein the first sensor system includes an obstacle sensor selected from the group of a camera-based sensor, a laser-based sensor, a radar-based sensor, a LIDAR-based sensor, and an acoustic-based sensor.

3. The system of claim 2 wherein the first sensor system further includes a position sensor selected from the group of a GPS unit, an inertial navigation unit, an inertial measurement unit, and a barometer.

4. The system of claim 2 wherein the first sensor system further includes an attitude sensor selected from the group of a magnetometer, an accelerometer, and a sun sensor.

5. The system of claim 1 further comprising:
- a second sensor system carried by the other one of the first and second aerial vehicles, the second sensor system including a sensor selected from the group of an obstacle sensor, a position sensor, and an attitude sensor, the second sensor system providing data about flight characteristics of the aerial vehicle by which it is carried to the processor in the aerial vehicle.

6. The system of claim 5 wherein at least one of the first and second sensor systems includes an array of four cameras carried by the aerial vehicle.

7. The system of claim 6 wherein the four cameras are located at four maximally separated positions on the aerial vehicle.

8. The system of claim 6 wherein the processor on the aerial vehicle with the sensor system with the four cameras receives data from the cameras and processes the data using a scene reconstruction process.

9. The system of claim 5 wherein the processors in the aerial vehicles and the ground station provide simultaneous mapping of obstacles and localization of aerial vehicles relative to the obstacles.

10. The system of claim 1 wherein the data gathered by the first sensor system about obstacles includes data about fixed obstacles.

11. The system of claim 1 wherein the data gathered by the first sensor system about obstacles includes data about moving obstacles.

12. The system of claim 11 wherein the data gathered by the first sensor system about moving obstacles includes data about the other aerial vehicle.

13. The system of claim 1 wherein the first tether segment provides a path for power from the ground station to the first aerial vehicle.

14. The system of claim 1 wherein the second tether segment provides a path for power from the first aerial vehicle to the second aerial vehicle.

15. The system of claim 1 wherein the tether segments provide a path for data transmission between the ground station and the aerial vehicles.

16. The system of claim 1 wherein at least one of the aerial vehicles has a wireless link to the ground station for data transmission between the ground station and the aerial vehicle.

17. The system of claim 1 wherein at least one of the aerial vehicles further includes a plurality of spaced-apart rotors, the rotors configured to spin about a substantially vertical axis during flight of the aerial vehicle, the aerial vehicle further including a frame with a structure for preventing contact of the rotors with the tether segments.

18. A tethered aerial vehicle system comprising:
- a ground station;
- an aerial vehicle including a plurality of spaced-apart rotors, each rotor configured to spin about a substantially vertical axis during flight of the aerial vehicle, wherein the substantially vertical axes are spaced apart from one another;
- a tether segment coupling the ground station to the aerial vehicle;
- the aerial vehicle further including a frame with a structure for preventing contact of the rotors with the tether segment, the frame defining a plurality of corners and a plurality of substantially straight outer edges interconnecting the corners, and wherein each rotor is located adjacent a corner.

19. The system of claim 18 wherein the structure for preventing contact of the rotors with the tether segment includes a stand-off joint coupled between the tether segment and the aerial vehicle.

20. The system of claim 18 wherein the frame defines a planform that is substantially quadrilateral and surrounds the rotors to prevent contact of the rotors with the tether segment.

21. The system of claim 20 wherein the planform includes a slot.

22. The system of claim 21 wherein the frame includes a stand-off joint coupled between the tether segment and the aerial vehicle, and further wherein the stand-off joint is pivotally coupled to the aerial vehicle for movement through the slot.

23. The system of claim 18 wherein the frame includes a band defining an outline of a planform having a substantially quadrilateral shape.

24. The system of claim 23 wherein the band is formed substantially of a composite material.

25. The system of claim 24 wherein the substantially composite material includes an aramid-epoxy composite.

26. A system for maneuvering a payload in an air space constrained by one or more obstacles, the system comprising:
   a first aerial vehicle defining a plurality of flight characteristics and having a processor for handling data about the flight characteristics of the first aerial vehicle;
   a second aerial vehicle configured to carry the payload, the second aerial vehicle defining a plurality of flight characteristics and having a processor for handling data about the flight characteristics of the second aerial vehicle;
   a first sensor system carried by one of the first and second aerial vehicles, the sensor system coupled to the processor in the one of the first and second aerial vehicles that is carrying the first sensor system, the sensor configured to gather data about obstacles in the air space and to develop data about flight characteristics of at least one of the first and second aerial vehicles, the sensor system configured to provide the data to the processor to which the sensor system is coupled;
   a ground station having a flight control processor configured to maintain a first dataset about obstacles in the air space and a second dataset about flight characteristics of the first and second aerial vehicles;
   a first tether segment coupling the ground station to the first aerial vehicle;
   a second tether segment coupling the second aerial vehicle to the first aerial vehicle; and
   wherein at least one of the aerial vehicles further includes a plurality of spaced-apart rotors, the rotors configured to spin about a substantially vertical axis during flight of the aerial vehicle, the aerial vehicle further including a frame with a structure for preventing contact of the rotors with the tether segments.

27. The system of claim 26 further comprising:
   a second sensor system carried by the other one of the first and second aerial vehicles, the second sensor system including a sensor selected from the group of an obstacle sensor, a position sensor, and an attitude sensor, the second sensor system providing data about flight characteristics of the aerial vehicle by which it is carried to the processor in the aerial vehicle.

28. The system of claim 27 wherein the processors in the aerial vehicles and the ground station provide simultaneous mapping of obstacles and localization of aerial vehicles relative to the obstacles.

29. The system of claim 26 wherein the tether segments provide a path for power from the ground station to the aerial vehicles.

30. The system of claim 29 wherein the tether segments provide a path for data transmission between the ground station and the aerial vehicles.

31. The system of claim 29 wherein at least one of aerial vehicles has a wireless link to the ground station for data transmission between the ground station and the aerial vehicle.

32. The system of claim 26 wherein the structure for preventing contact of the rotors with the tether segment includes a stand-off joint coupled between the tether segment and the aerial vehicle.

33. The system of claim 26 wherein the frame defines a planform that is substantially quadrilateral and surrounds the rotors to prevent contact of the rotors with the tether segment.

34. The system of claim 33 wherein the planform includes a slot.

35. The system of claim 34 wherein the frame includes a stand-off joint coupled between the tether segment and the aerial vehicle, and further wherein the stand-off joint is pivotally coupled to the aerial vehicle for movement through the slot.

36. A system for maneuvering a payload in an air space constrained by one or more obstacles, the system comprising:
   an aerial vehicle defining an airframe and configured to carry the payload, the aerial vehicle having a processor for handling data about the flight characteristics of the aerial vehicle;
   a sensor system carried by the aerial vehicle, the sensor system coupled to the processor in the aerial vehicle, the sensor system including a plurality of cameras pointing outward from the airframe, the cameras configured to gather data about obstacles in the air space and to provide the data to the processor,
   and further wherein the processor receives the data from the cameras and processes the data using a scene reconstruction process.

37. The system of claim 36 wherein the scene reconstruction process includes a stereophotogrammetry process.

38. The system of claim 36 wherein the scene reconstruction process includes an optical flow process.

39. The system of claim 36 further comprising a ground station and a tether coupling the ground station to the aerial vehicle.

40. The system of claim 39 wherein the tether provides a path for power from the ground station to the aerial vehicle.

41. The system of claim 39 wherein the tether provides a path for data transmission between the ground station and the aerial vehicle.

42. The system of claim 39 wherein the aerial vehicle has a wireless link to the ground station for data transmission between the ground station and the aerial vehicle.

43. The system of claim 36 further comprising a ground station, a second aerial vehicle, and first and second tether segments coupling the ground station and the aerial vehicles.

44. The system of claim 36 wherein the processor uses a stereophotogrammetry process and an optical flow process to process the data from the cameras.

45. The system of claim 44 wherein the processor uses a key frame bundle adjustment in calculating at least one vector to at least one obstacle.

46. The system of claim 45 wherein the processor uses the key frame bundle adjustment to calculate a trajectory of the aerial vehicle.

47. The system of claim 36 wherein the sensor system further includes a position sensor selected from the group of a GPS unit, an inertial navigation unit, an inertial measurement unit, and a barometer, the position sensor providing data to the processor.

48. The system of claim 47 wherein the processor uses an extended Kalman filter to integrate data from the position sensor with data from the cameras.

49. The system of claim 36 wherein the sensor system further includes an attitude sensor selected from the group of a magnetometer, an accelerometer, and a sun sensor, the attitude sensor providing data to the processor.

50. The system of claim 49 wherein the processor uses an extended Kalman filter to integrate data from the attitude sensor with data from the cameras.

51. The system of claim 36 wherein the processor in the aerial vehicle provides simultaneous mapping of obstacles and localization of the aerial vehicle relative to the obstacles.

52. The system of claim 36 wherein the processor in the aerial vehicle includes more than one processing units.

53. The system of claim 52 wherein the processing units in the aerial vehicle include a camera processing unit for processing data from each of the cameras.

54. The system of claim 53 wherein the processing units in the aerial vehicle include a processing unit for integrating data from the camera processing units to calculate a navigation solution of the aerial vehicle.

55. The system of claim 53 wherein the camera processing units in the aerial vehicle include at least one graphical processing unit.

56. The system of claim 36 wherein each camera pointing outward from the airframe of the aerial vehicle defines a field of view, and wherein the fields of view of at least two cameras are overlapping.

57. The system of claim 56 wherein the plurality of cameras includes at least three cameras pointing outward from the airframe of the vehicle.

58. The system of claim 56 wherein the plurality of cameras includes at least four cameras pointing outward from the airframe of the vehicle.

59. The system of claim 56 wherein the airframe frame defines a planform that is substantially quadrilateral, the planform having four corners, and wherein one of the four cameras is located adjacent each corner of the planform.

60. A tethered aerial vehicle system comprising:
a ground station;
an aerial vehicle including a plurality of spaced-apart rotors, the rotors configured to spin about a substantially vertical axis during flight of the aerial vehicle, the aerial vehicle further including a frame;
a stand-off joint coupled to the frame of the aerial vehicle;
a tether segment coupled between the ground station and the stand-off joint.

61. The system of claim 60 wherein the frame defines a planform that is substantially quadrilateral and surrounds the rotors to prevent contact of the rotors with the tether segment.

62. The system of claim 61 wherein the planform includes a slot.

63. The system of claim 62 wherein the stand-off joint is pivotally movable through the slot.

64. The system of claim 60 wherein the stand-off joint provides a substantially rigid interconnect between the frame of the aerial vehicle and the tether segment.

65. The system of claim 60 wherein the stand-off joint provides a semi-rigid interconnect between the frame of the aerial vehicle and the tether segment.

66. The system of claim 60 wherein the stand-off joint is coupled to the frame of the aerial vehicle by a universal joint.

67. The system of claim 66 wherein the universal joint is formed by a pair of pivot joints, each pivot joint defining an axis, wherein the axes of the pivot joints are substantially orthogonal.

68. The system of claim 66 wherein the universal joint is formed by a pair of eyebolts.

69. The system of claim 66 wherein the universal joint includes a tube formed of a composite material, and further including a bushing mounted for rotational motion around the tube.

70. An aerial vehicle system comprising:
an aerial vehicle including a plurality of spaced-apart rotors, the rotors configured to spin about a substantially vertical axis during flight of the aerial vehicle, the aerial vehicle further including a frame;
a stand-off joint coupled to the frame of the aerial vehicle, the stand-off joint defining a proximal end adjacent the frame and a distal end; and
a payload coupled to the stand-off joint adjacent the distal end.

71. The system of claim 70 further comprising a tether segment and a ground station, the tether segment coupled between the ground station and the stand-off joint.

72. The system of claim 70 wherein the payload includes a camera.

73. A system for maneuvering a payload in an air space constrained by one or more obstacles, the system comprising:
an aerial vehicle defining an airframe and configured to carry the payload, the aerial vehicle defining a plurality of flight characteristics and having a processor for handling data about the flight characteristics of the aerial vehicle;
a sensor system carried by the aerial vehicle, the sensor system coupled to the processor in the aerial vehicle, the sensor system configured to gather data about obstacles in the air space and to provide the data to the processor in the aerial vehicle, and wherein the processor in the aerial vehicle calculates a cost function based on the flight characteristics of the aerial vehicle and the obstacles in the air space;
a ground station having a flight control processor;
a tether coupling the ground station to the aerial vehicle, and wherein the aerial vehicle communicates with the ground station, the processor in the aerial vehicle providing the cost function to the flight control processor in the ground station and further wherein the flight control processor is configured to optimize the cost function for control of the aerial vehicle.

74. A system for maneuvering a payload in an air space constrained by one or more obstacles, the system comprising:
a first aerial vehicle defining a plurality of flight characteristics and having a processor for handling data about the flight characteristics of the first aerial vehicle;
a second aerial vehicle configured to carry the payload, the second aerial vehicle defining a plurality of flight characteristics and having a processor for handling data about the flight characteristics of the second aerial vehicle;
a ground station having a flight control processor configured to maintain a first dataset about obstacles in the air space and a second dataset about flight characteristics of the first and second aerial vehicles;
a first tether segment coupling the ground station to the first aerial vehicle;
a second tether segment coupling the second aerial vehicle to the first aerial vehicle;
a first sensor system carried by one of the first and second aerial vehicles, the sensor system coupled to the processor in the one of the first and second aerial vehicles that is carrying the first sensor system, the sensor configured to gather data about obstacles in the air space and to develop data about flight characteristics of at least one of the first and second aerial vehicles, the sensor system configured to provide the data to the processor to which the sensor system is coupled, and wherein the processor calculates a cost function based on the flight characteristics of the aerial vehicle and the obstacles in the air space and provides the cost function to the flight control processor in the ground station, and further wherein the flight control processor is configured to optimize the cost function for control of at least one of the aerial vehicles.

\* \* \* \* \*